United States Patent
Kim et al.

(10) Patent No.: US 10,372,663 B2
(45) Date of Patent: Aug. 6, 2019

(54) SHORT ADDRESS MODE FOR COMMUNICATING WAVEFORM

(71) Applicant: QUALCOMM Incorporated, San Diego, CA (US)

(72) Inventors: Kyu Hak Kim, San Ramon, CA (US); Guangming Bu, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 141 days.

(21) Appl. No.: 15/658,748

(22) Filed: Jul. 25, 2017

(65) Prior Publication Data

US 2019/0034374 A1 Jan. 31, 2019

(51) Int. Cl.
G06F 13/42 (2006.01)

(52) U.S. Cl.
CPC .......... *G06F 13/4282* (2013.01); *G06F 13/42* (2013.01); *G06F 2213/0016* (2013.01); *G06F 2213/0052* (2013.01)

(58) Field of Classification Search
CPC .............................. G06F 13/40; G06F 13/4282
USPC ....................................................... 710/110
See application file for complete search history.

(56) References Cited

U.S. PATENT DOCUMENTS

| | | | |
|---|---|---|---|
| 7,013,178 B2 | 3/2006 | Reinke et al. | |
| 7,328,399 B2 | 2/2008 | Marshall et al. | |
| 7,908,334 B2 | 3/2011 | Huelskamp et al. | |
| 9,252,900 B2 | 2/2016 | Poulsen | |
| 9,710,423 B2 * | 7/2017 | Sengoku | G06F 13/364 |
| 9,836,123 B2 * | 12/2017 | Gipson | G06F 3/016 |
| 9,990,316 B2 * | 6/2018 | Mishra | G06F 13/362 |
| 10,042,798 B2 * | 8/2018 | Tenbroek | G06F 13/364 |
| 2004/0059965 A1 | 3/2004 | Marshall et al. | |
| 2016/0314087 A1 | 10/2016 | Poulsen | |
| 2017/0199832 A1 | 7/2017 | Mishra et al. | |

FOREIGN PATENT DOCUMENTS

GB    2518716 A    4/2015

OTHER PUBLICATIONS

International Search Report and Written Opinion—PCT/US2018/042313—ISA/EPO—dated Oct. 5, 2015.

\* cited by examiner

*Primary Examiner* — Brian T Misiura
(74) *Attorney, Agent, or Firm* — Loza & Loza LLP

(57) ABSTRACT

Systems, methods, and apparatus for data communication are provided. A device operating as a bus master may be detect one or more slaves on a serial bus supporting a shortened address mode for receiving a waveform having at least one of a shortened slave address or a shortened register address. The bus master may then calculate a number of slave address bits needed to address the one or more slaves in a binary form based on a quantity of the one or more slaves and generate shortened slave addresses for the one or more slaves, respectively. A length of each shortened slave address is the number of slave address bits. The bus master may then assign a generated shortened slave address to each of the one or more slaves and send the waveform to a slave via the serial bus using an assigned shortened slave address.

24 Claims, 18 Drawing Sheets

Sensor Register Map

| Name | Address | READ/WRITE | Description | Bit Width | Remarks |
|---|---|---|---|---|---|
| WIA1 | 00h | READ | Company ID | 8 | |
| WIA2 | 01h | READ | Device ID | 8 | |
| RSV1 | 02h | READ | Reserved 1 | 8 | |
| RSV2 | 03h | READ | Reserved 2 | 8 | |
| ST1 | 10h | READ | Status 1 | 8 | Data status |
| HXL | 11h | READ | Measurement Magnetic Data | 8 | X-axis data |
| HXH | 12h | READ | | 8 | X-axis data |
| HYL | 13h | READ | | 8 | Y-axis data |
| HYH | 14h | READ | | 8 | Y-axis data |
| HZL | 15h | READ | | 8 | Z-axis data |
| HZH | 16h | READ | | 8 | Z-axis data |
| TMPS | 17h | READ | Dummy | 8 | Dummy |
| ST2 | 18h | READ | Status 2 | 8 | Data status |
| CNTL1 | 30h | READ/WRITE | Dummy | 8 | Dummy |
| CNTL2 | 31h | READ/WRITE | Control 2 | 8 | Control settings |
| CNTL3 | 32h | READ/WRITE | Control 3 | 8 | Control settings |
| TS1 | 33h | READ/WRITE | Test | 8 | Do Not Access |
| TS2 | 34h | READ/WRITE | Test | 8 | Do Not Access |

900 — I3C Private Read Transfer initiated with Repeated START Condition in Normal mode

| Bit Count: | 1 | 7 | 1 | 1 | 8 | 1 | 1 | 7 | 1 | 1 | 8 | 1 | 1 |
|---|---|---|---|---|---|---|---|---|---|---|---|---|---|
| | Sr | Slave Address | W | A | Register Address | T | S | Slave Address | R | A | Read Data | T | P |

930 — I3C Private Read Transfer initiated with Repeated START Condition in Reduced Field mode

| Bit Count: | 1 | 4 | 1 | 1 | 3 | 1 | 1 | 4 | 1 | 1 | 8 | 1 | 1 |
|---|---|---|---|---|---|---|---|---|---|---|---|---|---|
| | Sr | Slave Address | W | A | Rgstr Adrs | T | S | Slave Address | R | A | Read Data | T | P |

932 (Slave Address), 934 (Rgstr Adrs)

960 — I3C Private Read Transfer initiated with Repeated START Condition in Combined Address mode

| Bit Count: | 1 | 7 | 1 | 1 | 1 | 4 | 1 | 1 | 8 | 1 | 1 |
|---|---|---|---|---|---|---|---|---|---|---|---|
| | Sr | Slave Address | Rgstr Adrs | W | A | Slave Address | R | A | Read Data | T | P |

962 (Rgstr Adrs)

| 4-bit Slave Address Selection in Shortened Slave Address mode | | | | | | | |
|---|---|---|---|---|---|---|---|
| 7-bit Address Field | | | | | | | Shortened Address |
| b6 | b5 | b4 | b3 | b2 | b1 | b0 | |
| 0 | 0 | 0 | 0 | x | x | x | No |
| 0 | 0 | 0 | 1 | x | x | x | Available |
| 0 | 0 | 1 | 0 | x | x | x | Available |
| 0 | 0 | 1 | 1 | x | x | x | Available |
| 0 | 1 | 0 | 0 | x | x | x | Available |
| 0 | 1 | 0 | 1 | x | x | x | Available |
| 0 | 1 | 1 | 0 | x | x | x | No |
| 1 | 0 | 0 | 0 | x | x | x | Available |
| 1 | 0 | 0 | 1 | x | x | x | Available |
| 1 | 0 | 1 | 0 | x | x | x | Available |
| 1 | 1 | 0 | 0 | x | x | x | No |
| 1 | 1 | 0 | 1 | x | x | x | No |
| 1 | 1 | 1 | 0 | x | x | x | No |
| 1 | 1 | 1 | 1 | x | x | x | No |

3-bit Slave Address Selection in Shortened Slave Address mode

| 7-bit Address Field ||||||| Shortened Address |
|----|----|----|----|----|----|----|----|
| b6 | b5 | b4 | b3 | b2 | b1 | b0 | |
| 0 | 0 | 0 | x | x | x | x | No |
| 0 | 0 | 1 | x | x | x | x | Available |
| 0 | 1 | 0 | x | x | x | x | Available |
| 0 | 1 | 1 | x | x | x | x | No |
| 1 | 0 | 0 | x | x | x | x | Available |
| 1 | 0 | 1 | x | x | x | x | No |
| 1 | 1 | 0 | x | x | x | x | No |
| 1 | 1 | 1 | x | x | x | x | No |

SHORT ADDRESS MODE FOR COMMUNICATING WAVEFORM

BACKGROUND

Field

The present disclosure relates generally to communication devices, and more particularly, to communicating waveforms between master and slave devices using a shortened address in a slave address field and/or a register address field of a waveform.

Background

Serial interfaces have become the preferred method for digital communication between integrated circuit (IC) devices in various apparatus. For example, mobile communications equipment may perform certain functions and provide capabilities using IC devices that include radio frequency transceivers, cameras, display systems, user interfaces, controllers, storage, and the like. General-purpose serial interfaces known in the industry, include the Inter-Integrated Circuit (I2C or I²C) serial bus and its derivatives and alternatives, including interfaces defined by the Mobile Industry Processor Interface (MIPI) Alliance, such as I3C and the Radio Frequency Front End (RFFE) interface.

In mobile devices, sensor processing may be performed in a processor that is turned ON while processing and turned OFF when not processing. Power consumption depends on a POWER ON time of the processor. For an I2C protocol, a POWER ON time may be a combination of a processing time and an IO time, wherein the IO time is a time elapsed while communicating data on a bus. For an I3C protocol, a POWER ON time may also be a combination of a processing time and an IO time. The POWER ON time for the I3C protocol may be reduced compared to the POWER ON time for the I2C protocol if the I3C protocol can facilitate a shorter IO time than the I2C protocol. Accordingly, techniques are needed for saving energy (decreasing device power consumption) by reducing the IO time in I3C communication.

SUMMARY

Certain aspects of the disclosure relate to systems, apparatus, methods and techniques for reducing an IO time of a processor by using a shortened address in a slave address field and/or a register address field of a frame/waveform to be communicated between devices.

In various aspects of the disclosure, a method performed by a device operating as a bus master may include detecting one or more slaves on a serial bus supporting a shortened address mode for receiving a waveform having at least one of a shortened slave address or a shortened register address, calculating a number of slave address bits needed to address the one or more slaves in a binary form based on a quantity of the one or more slaves, generating shortened slave addresses for the one or more slaves, respectively, wherein a length of each shortened slave address is the number of slave address bits, assigning a generated shortened slave address to each of the one or more slaves, and sending the waveform to a slave via the serial bus using an assigned shortened slave address.

In an aspect, the number of slave address bits is less than 7 bits. In another aspect, the calculated number of slave address bits is 1 bit if the quantity of the one more slaves is 1 slave, the calculated number of slave address bits is 2 bits if the quantity of the one or more slaves is 2 to 4 slaves, the calculated number of slave address bits is 3 bits if the quantity of the one or more slaves is 5 to 8 slaves, and the calculated number of slave address bits is 4 bits if the quantity of the one or more slaves is 9 to 16 slaves.

In an aspect, the method further includes detecting a quantity of registers within the slave, calculating a number of register address bits needed to address the registers in a binary form based on the quantity of registers, generating shortened register addresses for the registers, respectively, wherein a length of each shortened register address is the number of register address bits, and assigning a generated shortened register address to each of the registers, wherein the waveform is sent to the slave using the assigned shortened register address.

In an aspect, the number of register address bits is less than 8 bits. In another aspect, the calculated number of register address bits is 1 bit if the quantity of registers is 1 register, the calculated number of register address bits is 2 bits if the quantity of registers is 2 to 4 registers, the calculated number of register address bits is 3 bits if the quantity of registers is 5 to 8 registers, the calculated number of register address bits is 4 bits if the quantity of registers is 9 to 16 registers, and the calculated number of register address bits is 5 bits if the quantity of registers is 17 to 32 registers.

In an aspect, the detecting includes detecting whether the slave supports a reduced field mode or a combined address mode. Accordingly, the assigned shortened slave address and the assigned shortened register address occupy different fields in the waveform if the slave supports the reduced field mode. Otherwise, the assigned shortened slave address and the assigned shortened register address occupy a same field in the waveform if the slave supports the combined address mode.

In an aspect, the method further includes sending at least one of a first indication to the slave to activate the shortened address mode or a second indication to the slave to deactivate the shortened address mode.

In various aspects of the disclosure, a bus master apparatus may be configured to detect one or more slaves on the serial bus supporting a shortened address mode for receiving a waveform having at least one of a shortened slave address or a shortened register address, calculate a number of slave address bits needed to address the one or more slaves in a binary form based on a quantity of the one or more slaves, generate shortened slave addresses for the one or more slaves, respectively, wherein a length of each shortened slave address is the number of slave address bits, assign a generated shortened slave address to each of the one or more slaves, and send the waveform to a slave via the serial bus using an assigned shortened slave address. The bus master apparatus may further be configured to detect a quantity of registers within the slave, calculate a number of register address bits needed to address the registers in a binary form based on the quantity of registers, generate shortened register addresses for the registers, respectively, wherein a length of each shortened register address is the number of register address bits, and assign a generated shortened register address to each of the registers, wherein the waveform is sent to the slave using the assigned shortened register address. The bus master apparatus may further be configured to send at least one of a first indication to the slave to activate the shortened address mode or a second indication to the slave to deactivate the shortened address mode.

In various aspects of the disclosure, a bus master apparatus may have means for detecting one or more slaves on a serial bus supporting a shortened address mode for receiving a waveform having at least one of a shortened slave address or a shortened register address, means for calculating a number of slave address bits needed to address the one or more slaves in a binary form based on a quantity of the one or more slaves, means for generating shortened slave addresses for the one or more slaves, respectively, wherein a length of each shortened slave address is the number of slave address bits, means for assigning a generated shortened slave address to each of the one or more slaves, means for sending the waveform to a slave via the serial bus using an assigned shortened slave address, means for detecting a quantity of registers within the slave, means for calculating a number of register address bits needed to address the registers in a binary form based on the quantity of registers, means for generating shortened register addresses for the registers, respectively, wherein a length of each shortened register address is the number of register address bits, means for assigning a generated shortened register address to each of the registers, wherein the waveform is sent to the slave using the assigned shortened register address, and means for sending at least one of a first indication to the slave to activate the shortened address mode or a second indication to the slave to deactivate the shortened address mode.

In various aspects of the disclosure, a processor readable storage medium is disclosed. The storage medium may be a non-transitory storage medium and may store code that, when executed by one or more processors, causes the one or more processors to detect one or more slaves on a serial bus supporting a shortened address mode for receiving a waveform having at least one of a shortened slave address or a shortened register address, calculate a number of slave address bits needed to address the one or more slaves in a binary form based on a quantity of the one or more slaves, generate shortened slave addresses for the one or more slaves, respectively, wherein a length of each shortened slave address is the number of slave address bits, assign a generated shortened slave address to each of the one or more slaves, send the waveform to a slave via the serial bus using an assigned shortened slave address, detect a quantity of registers within the slave, calculate a number of register address bits needed to address the registers in a binary form based on the quantity of registers, generate shortened register addresses for the registers, respectively, wherein a length of each shortened register address is the number of register address bits, assign a generated shortened register address to each of the registers, wherein the waveform is sent to the slave using the assigned shortened register address, and send at least one of a first indication to the slave to activate the shortened address mode or a second indication to the slave to deactivate the shortened address mode.

In various aspects of the disclosure, a method performed by a slave coupled to a serial bus may include indicating to a bus master that the slave supports a shortened address mode for receiving a waveform having at least one of a shortened slave address or a shortened register address, receiving from the bus master an assignment of the shortened slave address, wherein a length of the shortened slave address is equivalent to a number of slave address bits needed to address in a binary form a quantity of slaves on the serial bus supporting the shortened address mode, and receiving the waveform from the bus master based on the shortened slave address.

In an aspect, the number of slave address bits is less than 7 bits. In another aspect, the number of slave address bits is 1 bit if the quantity slaves is 1 slave, the number of slave address bits is 2 bits if the quantity of slaves is 2 to 4 slaves, the number of slave address bits is 3 bits if the quantity of slaves is 5 to 8 slaves, and the number of slave address bits is 4 bits if the quantity of slaves is 9 to 16 slaves.

In an aspect, the method may further include indicating to the bus master a quantity of registers within the slave, and receiving from the bus master an assignment of shortened register addresses for the quantity of registers, respectively, wherein a length of each shortened register address is equivalent to a number of register address bits needed to address in a binary form the quantity of registers, wherein the waveform is received from the bus master based on an assigned shortened register address.

In an aspect, wherein the number of register address bits is less than 8 bits. In another aspect, the number of register address bits is 1 bit if the quantity of registers is 1 register, the number of register address bits is 2 bits if the quantity of registers is 2 to 4 registers, the number of register address bits is 3 bits if the quantity of registers is 5 to 8 registers, the number of register address bits is 4 bits if the quantity of registers is 9 to 16 registers, and the number of register address bits is 5 bits if the quantity of registers is 17 to 32 registers.

In an aspect, the indicating includes indicating whether the slave supports a reduced field mode or a combined address mode. Accordingly, the shortened slave address and the shortened register address occupy different fields in the waveform if the slave supports the reduced field mode. Otherwise, the shortened slave address and the shortened register address occupy a same field in the waveform if the slave supports the combined address mode.

In an aspect, the method may further include receiving at least one of a first indication from the bus master to activate the shortened address mode or a second indication from the bus master to deactivate the shortened address mode.

In various aspects of the disclosure, a slave device may be configured to indicate to a bus master that the slave device supports a shortened address mode for receiving a waveform having at least one of a shortened slave address or a shortened register address, receive from the bus master an assignment of the shortened slave address, wherein a length of the shortened slave address is equivalent to a number of slave address bits needed to address in a binary form a quantity of slaves on the serial bus supporting the shortened address mode, receive the waveform from the bus master based on the shortened slave address, indicate to the bus master a quantity of registers within the slave device, receive from the bus master an assignment of shortened register addresses for the quantity of registers, respectively, wherein a length of each shortened register address is equivalent to a number of register address bits needed to address in a binary form the quantity of registers, wherein the waveform is received from the bus master based on an assigned shortened register address, and receive at least one of a first indication from the bus master to activate the shortened address mode or a second indication from the bus master to deactivate the shortened address mode.

In various aspects of the disclosure, a slave device may have means for indicating to a bus master that the slave device supports a shortened address mode for receiving a waveform having at least one of a shortened slave address or a shortened register address, means for receiving from the bus master an assignment of the shortened slave address, wherein a length of the shortened slave address is equivalent to a number of slave address bits needed to address in a binary form a quantity of slaves on the serial bus supporting the shortened address mode, means for receiving the waveform from the bus master based on the shortened slave address, means for indicating to the bus master a quantity of registers within the slave device, means for receiving from the bus master an assignment of shortened register addresses for the quantity of registers, respectively, wherein a length of each shortened register address is equivalent to a number of register address bits needed to address in a binary form the quantity of registers, wherein the waveform is received from the bus master based on an assigned shortened register address, and means for receiving at least one of a first indication from the bus master to activate the shortened address mode or a second indication from the bus master to deactivate the shortened address mode.

In an aspect of the disclosure, a processor readable storage medium is disclosed. The storage medium may be a non-transitory storage medium and may store code that, when executed by one or more processors, causes the one or more processors to indicate to a bus master that the slave device supports a shortened address mode for receiving a waveform having at least one of a shortened slave address or a shortened register address, receive from the bus master an assignment of the shortened slave address, wherein a length of the shortened slave address is equivalent to a number of slave address bits needed to address in a binary form a quantity of slaves on the serial bus supporting the shortened address mode, receive the waveform from the bus master based on the shortened slave address, indicate to the bus master a quantity of registers within the slave device, receive from the bus master an assignment of shortened register addresses for the quantity of registers, respectively, wherein a length of each shortened register address is equivalent to a number of register address bits needed to address in a binary form the quantity of registers, wherein the waveform is received from the bus master based on an assigned shortened register address, and receive at least one of a first indication from the bus master to activate the shortened address mode or a second indication from the bus master to deactivate the shortened address mode.

BRIEF DESCRIPTION OF THE DRAWINGS

FIG. 7 illustrates a sensor register map of an example sensor device.

FIG. 9 illustrates examples of 10 time reduction for an I3C frame in a normal mode, an I3C frame in a reduced field mode, and an I3C frame in combined address mode.

FIG. 11 illustrates a table identifying a number of available addresses for a 3-bit slave address selection in a shortened slave address mode.

DETAILED DESCRIPTION

Figure 1:
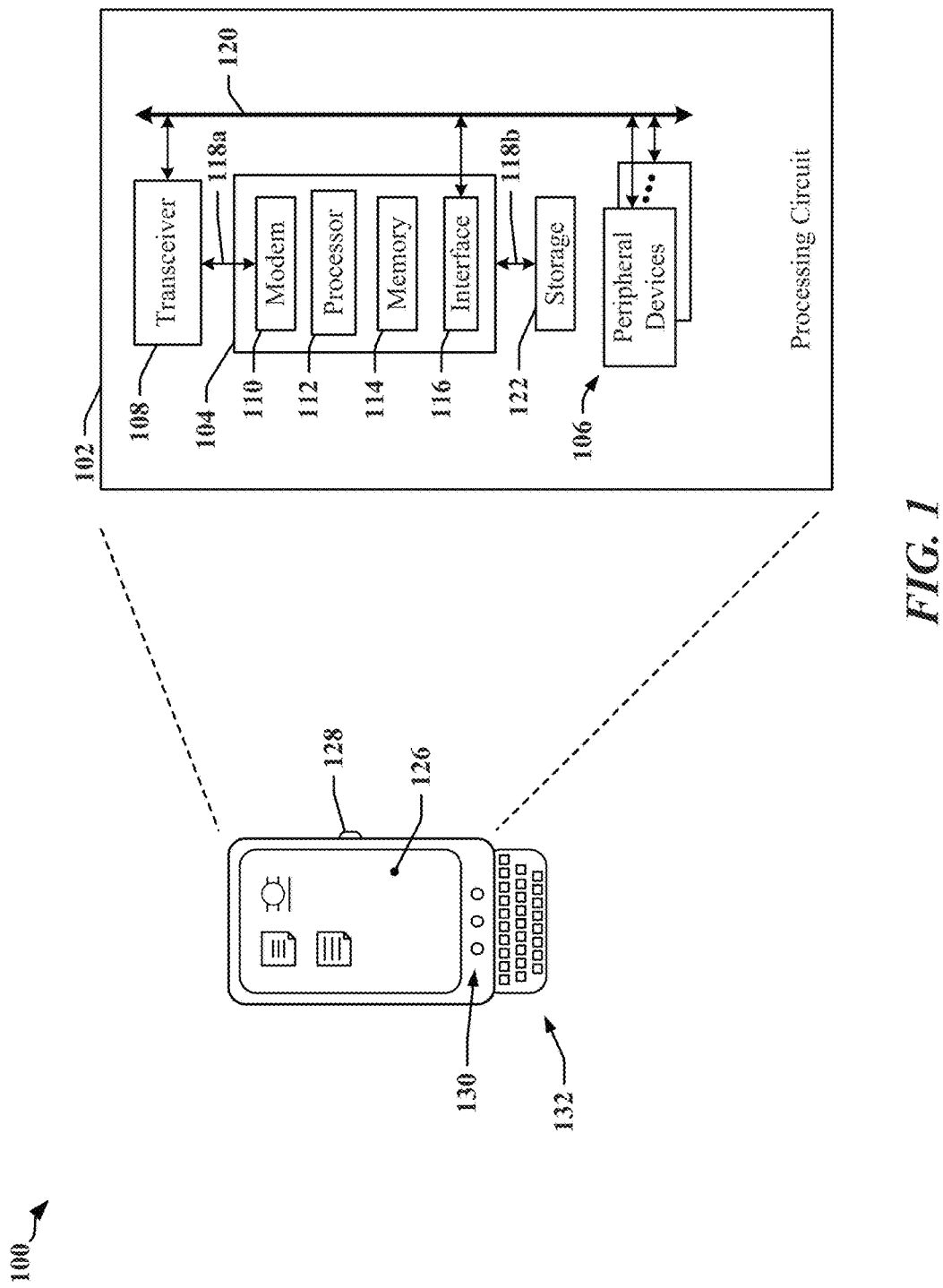
FIG. 1 illustrates an apparatus employing a data link between IC devices that is selectively operated according to one of a plurality of available standards.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

Overview

Devices that include multiple SoC and other IC devices often employ a shared communication interface that may include a serial bus or other data communication link to connect processors with modems and other peripherals. The serial bus or other data communication link may be operated in accordance with multiple standards or protocols defined. In one example, a serial bus may be operated in accordance with I2C, I3C, and/or RFFE protocols.

Certain aspects disclosed herein provide methods, circuits, and systems that are adapted to detect one or more slaves on a serial bus supporting a shortened address mode for receiving a waveform having at least one of a shortened slave address or a shortened register address, calculate a number of slave address bits needed to address the one or more slaves in a binary form based on a quantity of the one or more slaves, and generate shortened slave addresses for the one or more slaves, respectively. A length of each shortened slave address is the number of slave address bits. Accordingly, a generated shortened slave address may be assigned to each of the one or more slaves and the waveform may be sent to a slave using an assigned shortened slave address. As such, an IO time for communicating the waveform on the serial bus is reduced, thus reducing a device POWER ON time and increasing energy savings.

Examples of Apparatus that Employ Serial Data Links

According to certain aspects, a serial data link may be used to interconnect electronic devices that are subcomponents of an apparatus such as a cellular phone, a smart phone, a session initiation protocol (SIP) phone, a laptop, a notebook, a netbook, a smartbook, a personal digital assistant (PDA), a satellite radio, a global positioning system (GPS) device, a smart home device, intelligent lighting, a multimedia device, a video device, a digital audio player (e.g., MP3 player), a camera, a game console, an entertainment device, a vehicle component, a wearable computing device (e.g., a smart watch, a health or fitness tracker, eyewear, etc.), an appliance, a sensor, a security device, a vending machine, a smart meter, a drone, a multicopter, or any other similar functioning device.

FIG. 1 illustrates an example of an apparatus 100 that may employ a data communication bus. The apparatus 100 may include a processing circuit 102 having multiple circuits or devices 104, 106, and/or 108, which may be implemented in one or more application-specific integrated circuits (ASICs) or in a SoC. In one example, the apparatus 100 may be a communication device and the processing circuit 102 may include a processing device provided in an ASIC 104, one or more peripheral devices 106, and a transceiver 108 that enables the apparatus to communicate with a radio access network, a core access network, the Internet, and/or another network.

The ASIC 104 may have one or more processors 112, one or more modems 110, on-board memory 114, a bus interface circuit 116, and/or other logic circuits or functions. The processing circuit 102 may be controlled by an operating system that may provide an application programming interface (API) layer that enables the one or more processors 112 to execute software modules residing in the on-board memory 114 or other processor-readable storage 122 provided on the processing circuit 102. The software modules may include instructions and data stored in the on-board memory 114 or processor-readable storage 122. The ASIC 104 may access its on-board memory 114, the processor-readable storage 122, and/or storage external to the processing circuit 102. The on-board memory 114, the processor-readable storage 122 may include read-only memory (ROM) or random-access memory (RAM), electrically erasable programmable ROM (EEPROM), flash cards, or any memory device that can be used in processing systems and computing platforms. The processing circuit 102 may include, implement, or have access to a local database or other parameter storage that can maintain operational parameters and other information used to configure and operate the apparatus 100 and/or the processing circuit 102. The local database may be implemented using registers, a database module, flash memory, magnetic media, EEPROM, soft or hard disk, or the like. The processing circuit 102 may also be operably coupled to external devices such as a display 126, operator controls, such as switches or buttons 128, 130, and/or an integrated or external keypad 132, among other components. A user interface module may be configured to operate with the display 126, keypad 132, etc. through a dedicated communication link or through one or more serial data interconnects.

The processing circuit 102 may provide one or more buses 118a, 118b, 120 that enable certain devices 104, 106, and/or 108 to communicate. In one example, the ASIC 104 may include a bus interface circuit 116 that includes a combination of circuits, counters, timers, control logic, and other configurable circuits or modules. In one example, the bus interface circuit 116 may be configured to operate in accordance with communication specifications or protocols. The processing circuit 102 may include or control a power management function that configures and manages the operation of the apparatus 100.

Figure 2:
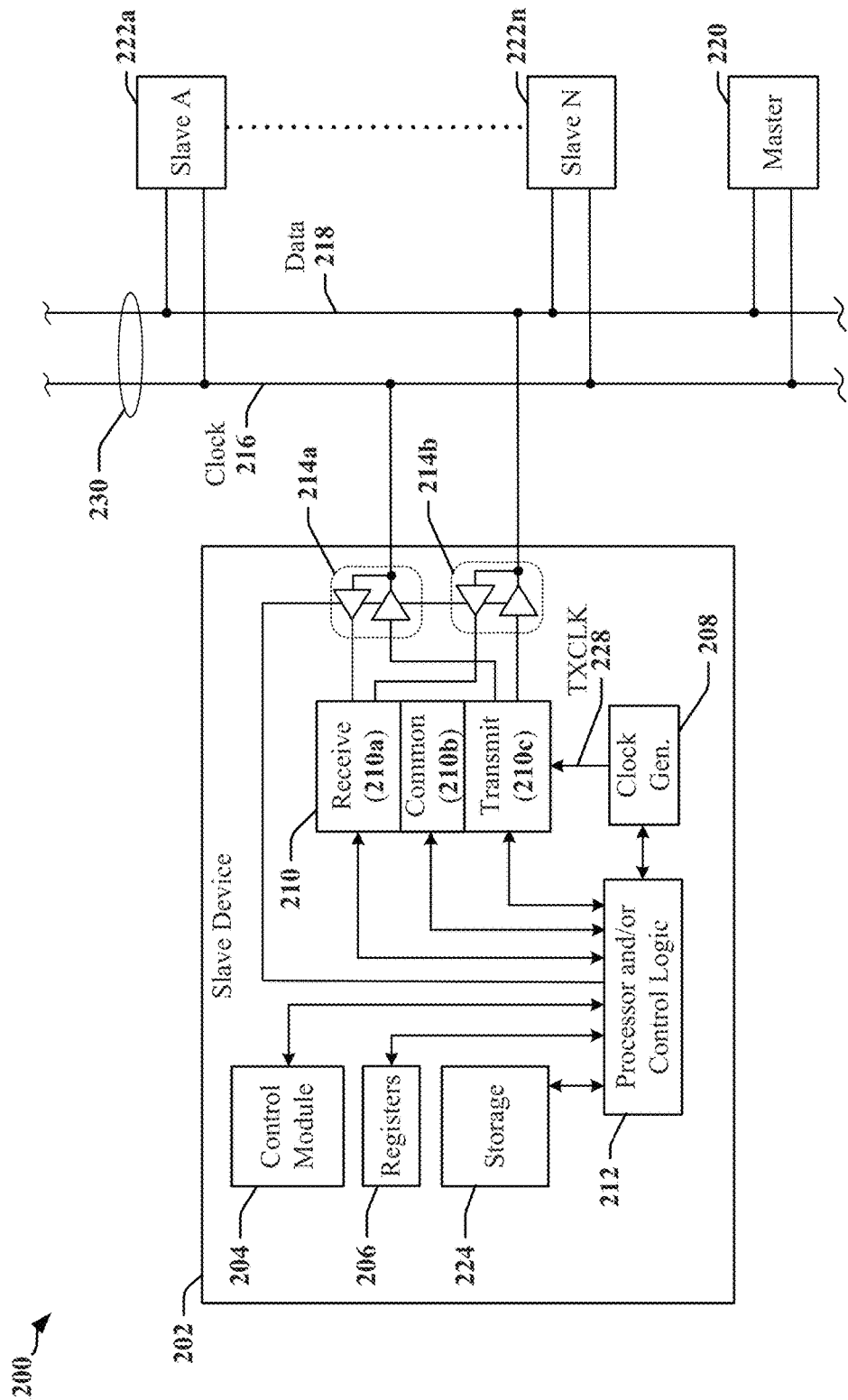
FIG. 2 illustrates a system architecture for an apparatus employing a data link between IC devices.

FIG. 2 illustrates certain aspects of an apparatus 200 that includes multiple devices 202, 220, and 222a-222n connected to a serial bus 230. The devices 202, 220, and 222a-222n may include one or more semiconductor IC devices, such as an applications processor, SoC or ASIC. Each of the devices 202, 220, and 222a-222n may include, support or operate as a modem, a signal processing device, a display driver, a camera, a user interface, a sensor, a sensor controller, a media player, a transceiver, and/or other such components or devices. Communications between devices 202, 220, and 222a-222n over the serial bus 230 are controlled by a bus master 220. Certain types of bus can support multiple bus masters 220.

The apparatus 200 may include multiple devices 202, 220, and 222a-222n that communicate when the serial bus 230 is operated in accordance with I2C, I3C, or other protocols. At least one device 202, 222a-222n may be configured to operate as a slave device on the serial bus 230. In one example, a slave device 202 may be adapted to provide a control function 204. In some examples, the control function 204 may include circuits and modules that support a display, an image sensor, and/or circuits and modules that control and communicate with one or more sensors that measure environmental conditions. The slave device 202 may include configuration registers 206 or other storage 224, control logic 212, a transceiver 210 and line drivers/receivers 214a and 214b. The control logic 212 may include a processing circuit such as a state machine, sequencer, signal processor, or general-purpose processor. The transceiver 210 may include a receiver 210a, a transmitter 210c, and common circuits 210b, including timing, logic, and storage circuits and/or devices. In one example, the transmitter 210c encodes and transmits data based on timing in one or more signals 228 provided by a clock generation circuit 208.

Two or more of the devices 202, 220, and/or 222a-222n may be adapted according to certain aspects and features disclosed herein to support a plurality of different communication protocols over a common bus, which may include an I2C, and/or I3C protocol. In some instances, devices that communicate using the I2C protocol can coexist on the same 2-wire interface with devices that communicate using I3C protocols. In one example, the I3C protocols may support a mode of operation that provides a data rate between 6 megabits per second (Mbps) and 16 Mbps with one or more optional high-data-rate (HDR) modes of operation that provide higher performance. The I2C protocols may conform to de facto I2C standards providing for data rates that may range between 100 kilobits per second (kbps) and 3.2 megabits per second (Mbps). I2C and I3C protocols may define electrical and timing aspects for signals transmitted on the 2-wire serial bus 230, in addition to data formats and aspects of bus control. In some aspects, the I2C and I3C protocols may define direct current (DC) characteristics affecting certain signal levels associated with the serial bus 230, and/or alternating current (AC) characteristics affecting certain timing aspects of signals transmitted on the serial bus 230. In some examples, a 2-wire serial bus 230 transmits data on a first wire 218 and a clock signal on a second wire 216. In some instances, data may be encoded in the signaling state, or transitions in signaling state of the first wire 218 and the second wire 216.

Figure 3:
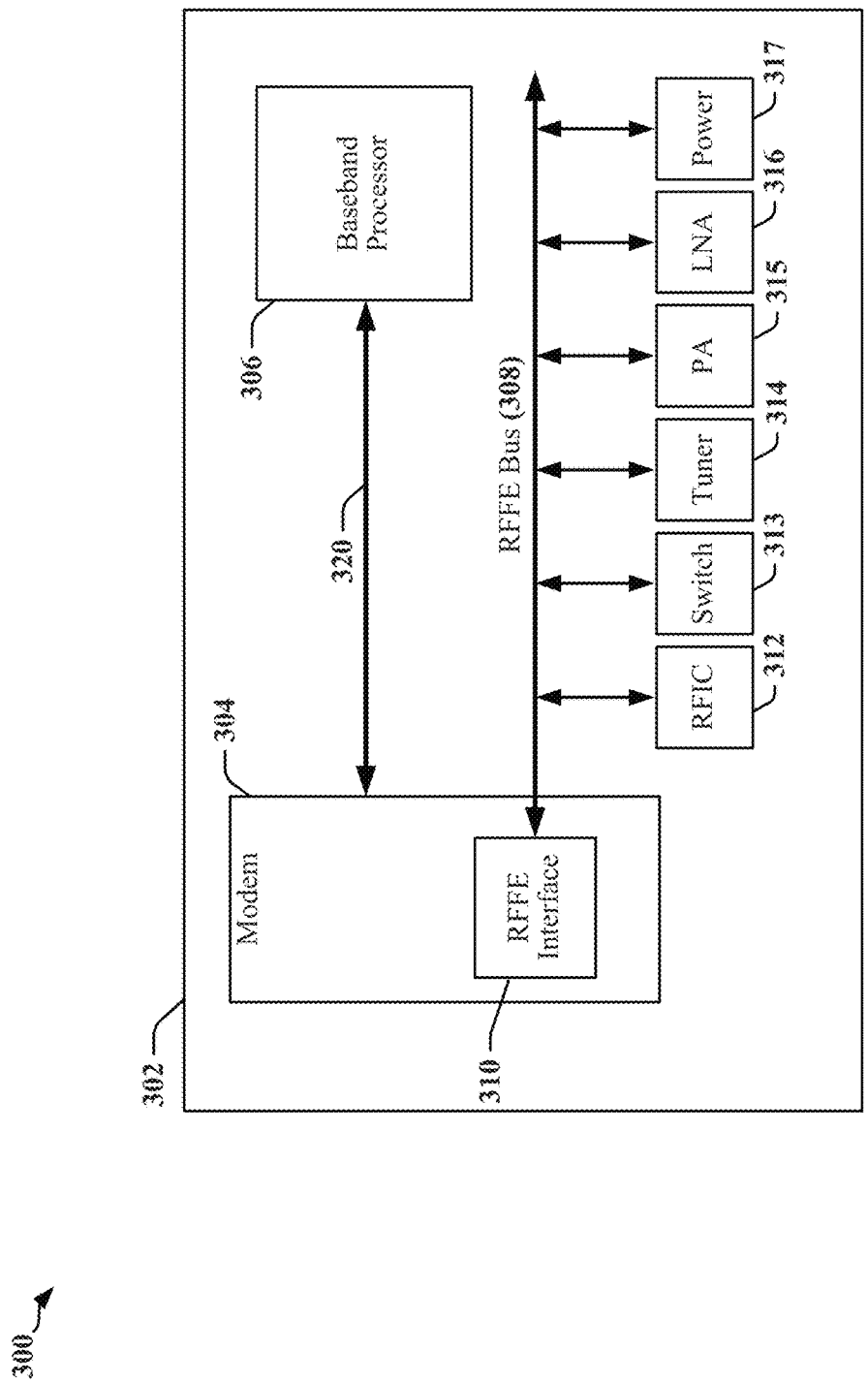
FIG. 3 illustrates a device that employs an RFFE bus to couple various radio frequency front-end devices.

FIG. 3 is a block diagram 300 illustrating an example of a device 302 that employs an RFFE bus 308 to couple various front-end devices 312-317. A modem 304 may include an RFFE interface 310 that couples the modem 304 to the RFFE bus 308. The modem 304 may communicate with a baseband processor 306. The illustrated device 302 may be embodied in one or more of a mobile communication device, a mobile telephone, a mobile computing system, a mobile telephone, a notebook computer, a tablet computing device, a media player, a gaming device, a wearable computing and/or communications device, an appliance, or the like. In various examples, the device 302 may be implemented with one or more baseband processors 306, modems 304, multiple communications links 308, 320, and various other buses, devices and/or different functionalities. In the example illustrated in FIG. 3, the RFFE bus 308 may be coupled to an RF integrated circuit (RFIC) 312, which may include one or more controllers, and/or processors that configure and control certain aspects of the RF front-end. The RFFE bus 308 may couple the RFIC 312 to a switch 313, an RF tuner 314, a power amplifier (PA) 315, a low noise amplifier (LNA) 316 and a power management module 317.

I3C Short Address Mode

Figure 4:
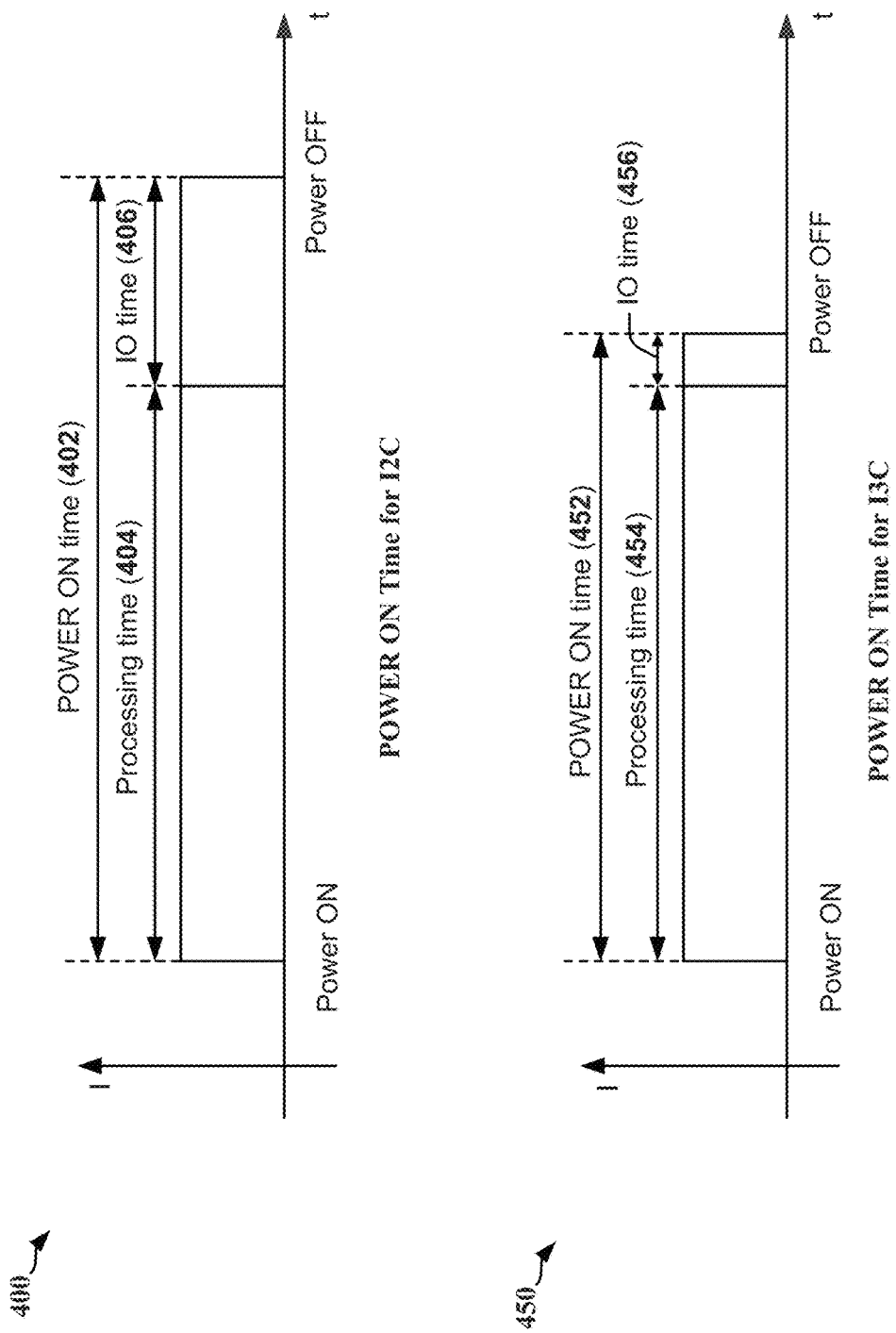
FIG. 4 illustrates an example POWER ON time for an I2C protocol and an example POWER ON time for an I3C protocol.

FIG. 4 illustrates an example POWER ON time for an I2C protocol 400 and an example POWER ON time for an I3C protocol 450.

I2C and Serial Peripheral Interface (SPI) protocols have been used in communications between a master (e.g., inside a processor) and a slave (e.g., accelerometer, gyro, magnetometer, or other sensor devices). An I3C specification may provide higher bandwidth by increasing clock speed and improving protocols.

In mobile devices, sensor processing may be performed in a processor that is turned ON while processing and turned OFF when not processing. Power consumption depends on a POWER ON time of the processor. Referring to FIG. 4, for the I2C protocol 400, a POWER ON time 402 is defined by the combination of a processing time 404 and an IO time 406, wherein the IO time is a time elapsed while communicating data on a bus. For the I3C protocol 450, a POWER ON time 452 is defined by the combination of a processing time 454 and an IO time 456. As seen in FIG. 4, the POWER ON time 452 for the I3C protocol 450 may be reduced compared to the POWER ON time 402 for the I2C protocol 400 because the I3C protocol 450 facilitates a shorter IO time than the I2C protocol. The present disclosure describes additional techniques for saving energy (decreasing power consumption) by further reducing the IO time in I3C communication.

Energy consumed by a device may be saved by reducing the IO time of a processor. The present disclosure provides methods for reducing the IO time by using a shortened address in: 1) a slave address field, and/or 2) a register address field of an I3C frame.

Figure 5:
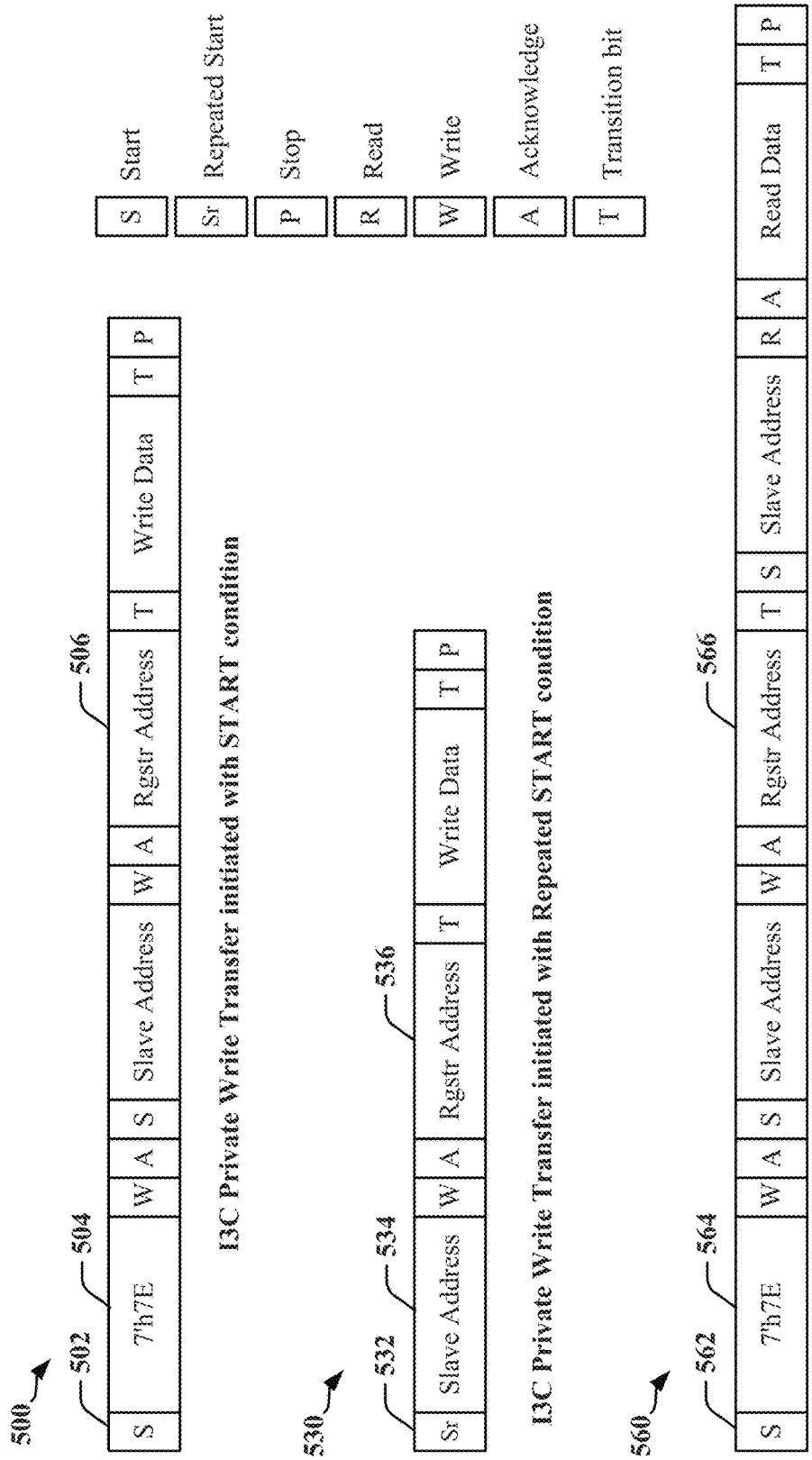
FIG. 5 illustrates examples of I3C frames/waveforms.

FIG. 5 illustrates examples of I3C frames/waveforms. A first I3C frame 500 may be an I3C private write transfer, for example. The first I3C frame 500 begins with a Start bit (S) 502 and is followed by a broadcast address field 504 (e.g., 7'h7E). The broadcast address field 504 may normally be 7 bits long and indicates a slave that an I3C master will communicate with. The first I3C frame 500 further includes a register address field 506 that may normally be 8 bits long and identifies a register to access within the slave to perform an operation.

A second I3C frame 530 may be an I3C private write transfer, for example. The second I3C frame 530 begins with a Repeated Start bit (Sr) 532 and is followed by a dynamic slave address field 534. The dynamic slave address field 534 may normally be 7 bits long and indicates a slave that an I3C master will communicate with. The second I3C frame 530 further includes a register address field 536 that may normally be 8 bits long and identifies a register to access within the slave to perform an operation.

A third I3C frame 560 may be an I3C private read transfer, for example. The third I3C frame 560 begins with a Start bit (S) 562 and is followed by a broadcast address field 564 (e.g., 7'h7E). The broadcast address field 564 may normally be 7 bits long and indicates a slave that an I3C master will communicate with. The third I3C frame 560 further includes a register address field 566 that may normally be 8 bits long and identifies a register to access within the slave to perform an operation.

Shortened Slave Address

Figure 6:
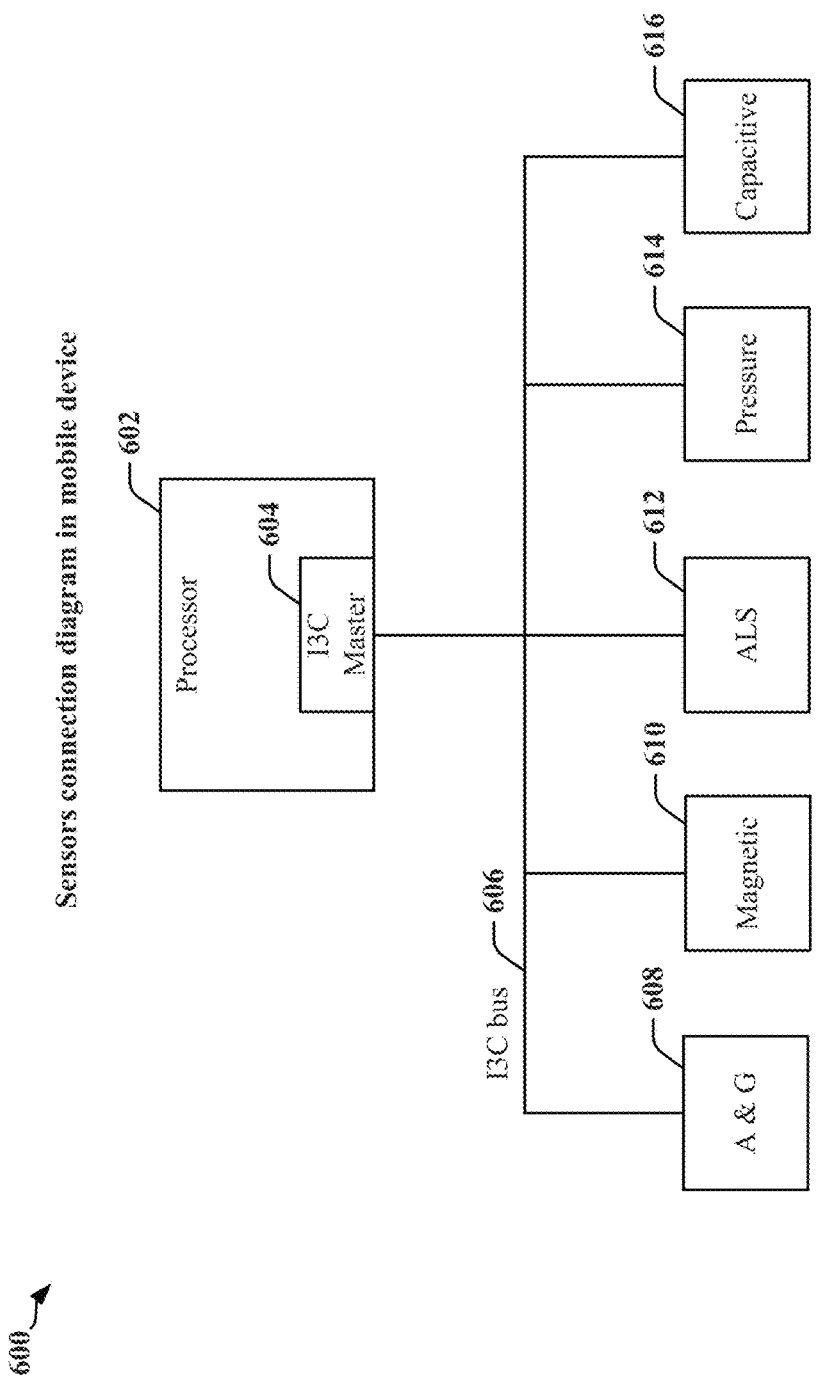
FIG. 6 illustrates an example sensors connection diagram in a mobile device.

FIG. 6 illustrates an example sensors connection diagram 600 in a mobile device. In the example, a processor 602 includes an I3C master 604. The I3C master 604 is connected via an I3C bus 606 to a number of slave devices (e.g., sensor devices). For example, the I3C master may be connected to an accelerometer and gyroscope (A & G) sensor 608, a magnetic sensor 610, an ambient light sensor (ALS) 612, a pressure sensor 614, and a capacitive sensor 616.

In an aspect, the I3C specification specifies a limitation on the number of addresses available for use. For example, there may be 108 addresses available to be used by slave devices. The I3C master 604 may freely allocate any one of the 108 addresses to each slave device. Hence, each of the slave devices 608, 610, 612, 614, and 616 may have a dedicated dynamic address after the allocation.

In an aspect, only a few sensor devices may be integrated into a mobile device. For example, a low-tier smartphone may include 1 or 2 sensors while a premium-tier smartphone may include 6 sensors (possibly 16 sensors at most). Accordingly, all possible sensors in the mobile device may be identified/addressed via a binary format using only 3 to 4 bits in a 7-bit slave address field of an I3C frame. The rest of the bits in the 7-bit slave address field may be redundant as they are not used to identify a sensor.

In an example, if a mobile device (e.g., smartphone) includes 5 sensor devices that are on the same I3C bus (e.g., the sensor devices 608, 610, 612, 614, and 616), then only 5 slave addresses are needed to identify all 5 sensor devices. Moreover, all 5 sensor devices may be identified/addressed via a binary format using only 3 bits in a 7-bit slave address field since the 3 bits are capable of being assigned a combination of binary values to cover a maximum of 8 slave addresses.

Shortened Register Address

FIG. 7 illustrates a sensor register map 700 of an example sensor device. In an aspect, a register address field of an I3C IO waveform (see FIG. 5 above) is utilized when accessing specific register(s) within a sensor device. Normally, the register address field uses 8 bits of clock timing regardless of the number of registers within the sensor device. Similar to shortening the slave address field, a mobile device may consume less energy by using a shortened register address field.

Referring to FIG. 7, an example sensor device may only have 18 registers as shown in the sensor register map 700. Accordingly, only 5 bits would be needed to identify all 18 registers and access all register contents. That is, all 18 registers may be identified/addressed via a binary format using only 5 bits in an 8-bit register address field since the 5 bits are capable of being assigned a combination of binary values to cover a maximum of 32 register addresses. As such, using only 5 bits instead of the normal 8 bits in the register address field will reduce IO timing when communicating a waveform.

Framing in Short Address Mode

Figure 8:
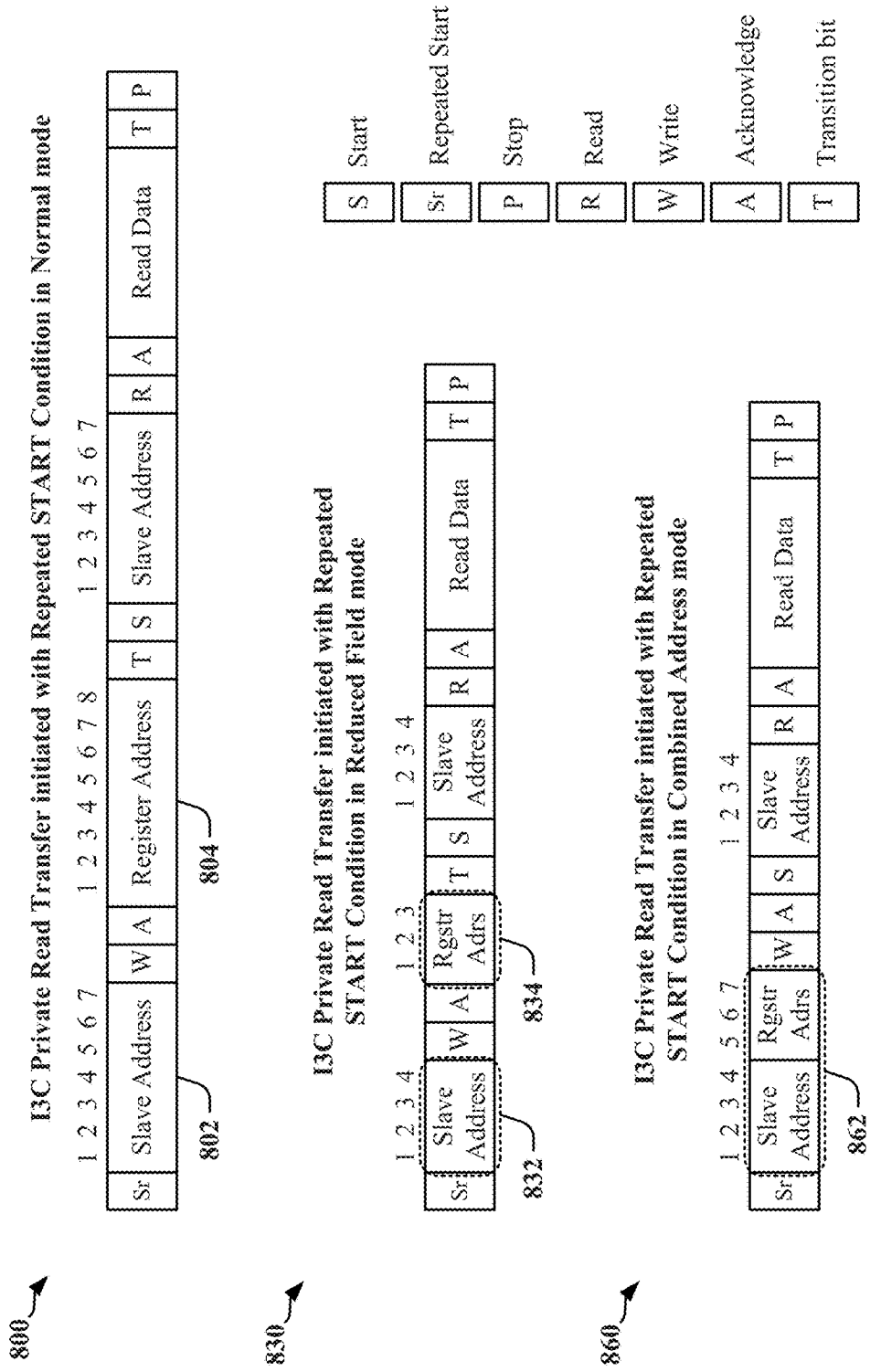
FIG. 8 illustrates examples of an I3C frame in a normal mode, an I3C frame in a reduced field mode, and an I3C frame in a combined address mode.

FIG. 8 illustrates an example of an I3C frame 800 in a normal mode. The I3C frame 800 may be an I3C private read transfer, for example. The I3C frame 800 may include a slave address field 802 that is 7 bits long and indicates a slave device that an I3C master will communicate with. The I3C frame 800 further includes a register address field 804 that is 8 bits long and identifies a register within the slave device that the I3C master intends to access.

In an aspect, a mobile device may utilize a shortened address technique within the I3C frame to consume less power during I3C communication. The shortened address technique may include shortening the slave address field and the register address field in the I3C frame. The slave address and the register address may be shortened within the I3C frame according to: 1) a reduced field mode, and 2) a combined address mode, which will be described below.

FIG. 8 further illustrates an example of an I3C frame 830 in a reduced field mode. In the reduced field mode, the I3C frame 830 maintains the same format as the normal mode I3C frame 800, but the slave address field and the register address field are shortened. Accordingly, in the example shown in FIG. 8, the reduced field I3C frame 830 may include a slave address field 832 that is 4 bits long and a register address field 834 that is 3 bits long. Notably, although the I3C frame 830 specifies a length of 4 bits for the slave address field 832, it is contemplated that the slave address field 830 may have a length of any number of bits less than 7 bits sufficient to address all possible sensors in the mobile device. Moreover, although the I3C frame 830 specifies a length of 3 bits for the register address field 834, it is contemplated that the register address field 834 may have a length of any number of bits less than 8 bits sufficient to address all possible registers within a slave device.

FIG. 8 further illustrates an example of an I3C frame 860 in a combined address mode. In the combined address mode, a shortened slave address and a shortened register address are combined and placed into a single field of the I3C frame. In the example shown in FIG. 8, the combined address I3C frame 860 includes a single combined address field 862 that is 7 bits long, wherein 4 bits of the 7-bit field 862 is occupied by a slave address and 3 bits of the 7-bit field 862 is occupied by a register address. The combined address field 862 replaces a normal slave address field (e.g., slave address field 802). Moreover, a normal register address field (e.g., register address field 804) is absent in the combined address mode I3C frame 860. Notably, although the I3C frame 860 specifies a length of 4 bits for the slave address, it is contemplated that the slave address may have a length of any number of bits less than 7 bits that is sufficient to address all possible sensors in the mobile device and able to fit within the space shared with the register address bits in the combined address field 862. Moreover, although the I3C frame 860 specifies a length of 3 bits for the register address, it is contemplated that the register address may have a length of any number of bits less than 8 bits that is sufficient to address all possible registers within a slave device and able to fit within the space shared with the slave address bits in the combined address field 862.

FIG. 9 illustrates examples of IO time reduction for an I3C frame 900 in a normal mode, an I3C frame 930 in a reduced field mode, and an I3C frame 960 in combined address mode. In the examples shown, the IO time reduction is with respect to reading one byte of data from a sensor via the normal mode I3C frame 900, the reduced field mode I3C frame 930, and the combined address mode I3C frame 960.

In an example, 5 sensor devices may be coupled to an I3C bus. Hence, a 4-bit slave address field may be used to address all possible sensor devices on the I3C bus. Moreover, each sensor device may have a total of 8 registers. Hence, a 3-bit register address field may be used to address all possible registers within a sensor device. Accordingly, the reduced field I3C frame 930 may include a slave address field 932 that is 4 bits long and a register address field 934 that is 3 bits long. Moreover, the combined address I3C frame 960 may include a single combined address field 962 that is 7 bits long, wherein 4 bits of the 7-bit field 962 is occupied by a slave address and 3 bits of the 7-bit field 962 is occupied by a register address.

As shown in FIG. 9, when the normal mode I3C frame 900 is used, 39 clock cycles (bit count=39) are needed for the I3C master to read one byte of data from a sensor device. When the reduced field mode I3C frame 930 is used, only 28 clock cycles (bit count=28) are needed for the I3C master to read one byte of data from a sensor device. When the combined address mode I3C frame 960 is used, only 27 clock cycles (bit count=27) are needed for the I3C master to read one byte of data from a sensor device. Accordingly, the reduced field mode I3C frame 930 saves approximately 28% of IO time when compared with the normal mode I3C frame 900, and the combined address mode I3C frame 960 saves approximately 30% of IO time when compared with the normal mode I3C frame 900.

Figure 10:
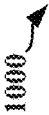
FIG. 10 illustrates a table identifying a number of available addresses for a 4-bit slave address selection in a shortened slave address mode.

FIG. 10 illustrates a table 1000 identifying a number of available addresses for a 4-bit slave address selection in a shortened slave address mode. FIG. 11 illustrates a table 1100 identifying a number of available addresses for a 3-bit slave address selection in a shortened slave address mode.

In an aspect, a shortened address mode may provide energy saving benefits if implemented by both the I3C master and slave. As previously mentioned, the I3C specification may limit the number of available addresses that can be used to identify slave devices. For example, the I3C specification may define 108 available addresses for slave address use. All other addresses may be limited or reserved.

In the shortened address mode, only a first few bits in a field (e.g., 7-bit field) of an I3C frame may be used. The rest of the bits in the field are omitted. Accordingly, a slave address portion may end earlier than normal in the field (reduced field mode), or two address portions (e.g., slave address portion and register address portion) are combined in the field (combined address mode). Shortened slave addresses may be selected such that the omitted bits will not fall into any addresses that are limited or reserved by the I3C specification.

Referring to the table 1000 of FIG. 10, based on the I3C specification, 10 addresses are available to identify slave devices in a 4-bit shortened slave address mode using a 7-bit address field. For example, the 10 available addresses are the addresses where the first 4 bits of a 7-bit field are: {0 0 0 1}1, {0 0 1 0}, {0 0 1 1}, {0 1 0 0}, {0 1 0 1}, {0 1 1 0}, {1 0 0 0}, {1 0 0 1}, {1 0 1 0}, and {1 1 0 0}.

Referring to the table 1100 of FIG. 11, based on the I3C specification, 3 addresses are available to identify slave devices in a 3-bit shortened slave address mode using a 7-bit address field. For example, the 3 available addresses are the addresses where the first 3 bits of a 7-bit field are: {0 0 1}, {0 1 0}, and {1 0 0}.

Figure 12:
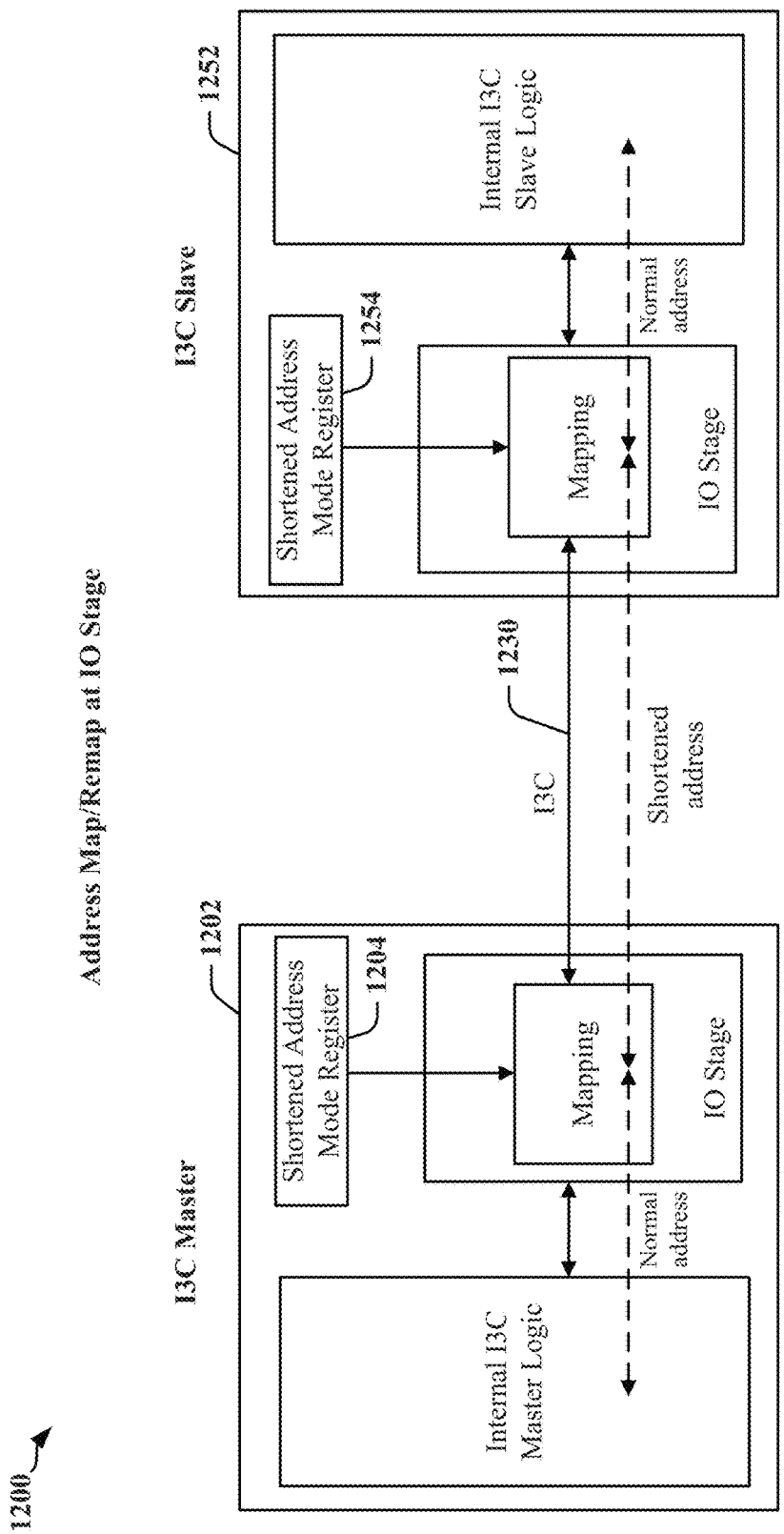
FIG. 12 is a diagram illustrating address mapping/remapping at an IO stage between an I3C master and an I3C slave.

FIG. 12 is a diagram 1200 illustrating address mapping/remapping at an IO stage between an I3C master 1202 and an I3C slave 1252. During initialization, the I3C master 1202 may read characteristic information from all I3C slaves 1252 coupled to an I3C bus 1230. The characteristic information may include a bus characteristics register (BCR) and a device characteristics register (DCR), which describes a slave device's role, capabilities, and device type. In addition to the BCR and DCR, the I3C master 1202 may read a shortened address mode register 1254 maintained within an I3C slave 1252 to learn if the slave supports a shortened address mode and learn of a number of registers within the slave. The I3C master 1202 may assign dynamic slave addresses, e.g., normal (7-bit) slave addresses and shortened (less than 7-bit) slave addresses. The I3C master 1202 may also maintain a shortened address mode register 1204.

If the I3C master 1202 senses that a shortened address mode of operation on the I3C bus 1230 is possible/beneficial, the I3C master 1202 may inform the I3C slaves 1252 of a change to the shortened address mode and have an active mode field in the shortened address mode register switched to the shortened address mode. If the I3C master 1202 senses that a normal address mode of operation is required on the I3C bus 1230, the I3C master 1202 may inform the I3C slaves 1252 of a change to the normal address mode and have the active mode field in the shortened address mode register switched to the normal address mode. To ease hardware/software development, all internal operations may be accomplished in the normal address mode while the shortened mode of operation (if enabled) may be limited to occur at the IO stage.

Figure 13:
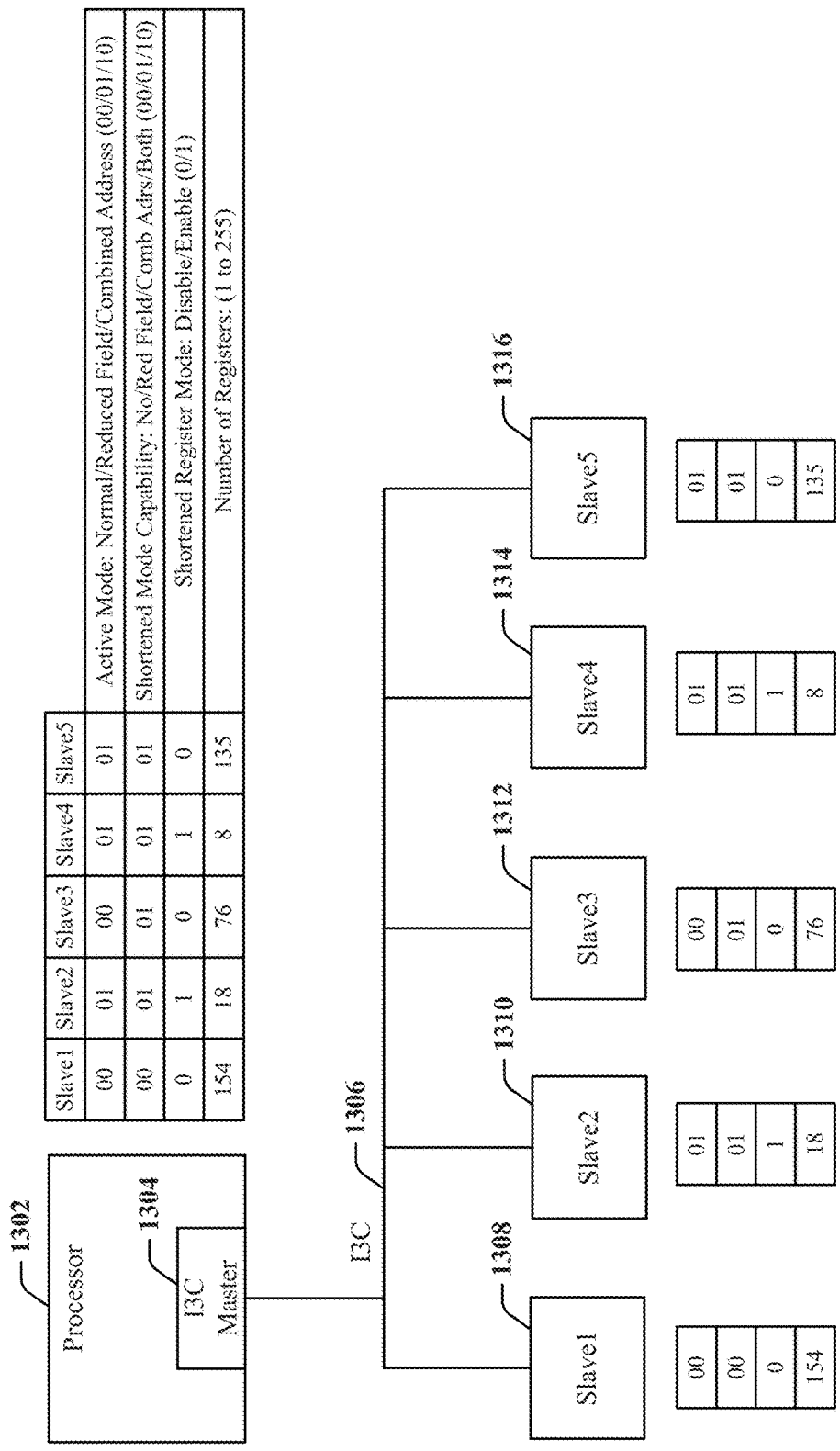
FIG. 13 is a diagram illustrating an example of shortened address mode registers for master and slave devices.

FIG. 13 is a diagram 1300 illustrating an example of shortened address mode registers for master and slave devices. In the example, a processor 1302 includes an I3C master 1304. The I3C master 1304 is connected via an I3C bus 1306 to a number of slave devices (e.g., sensor devices). For example, the I3C master 1304 may be connected to a first slave (Slave1) 1308, a second slave (Slave2) 1310, a third slave (Slave3) 1312, a fourth slave (Slave4) 1314, and a fifth slave (Slave5) 1316.

In an example operation, both normal address mode-capable slaves and shortened address mode-capable slaves may be connected on the same I3C bus 1306. The I3C master 1304 and the slaves 1308, 1310, 1312, 1314, and 1316 maintain shortened address mode registers. Accordingly, based on the example register values shown in FIG. 13, the Slave1 1308 is not capable of operating in a shortened address mode (Shortened Address Mode Capability={0 0 1} No). The Slave2 1310 and the Slave4 1314 are capable of operating in the shortened address mode (i.e., reduced field mode) and are currently running in a reduced field mode (Shortened Address Mode Capability={0 1 1} Reduced Field; Active Mode={0 1 1} Reduced Field). The Slave3 1312 is capable of operating in the shortened address mode (i.e., reduced field mode) but is currently running in a normal mode (Shortened Address Mode Capability={0 1 1} Reduced Field; Active Mode={0 0 1} Normal). The Slave5 1316 is capable of operating in the shortened address mode and is currently running in a reduced field mode (Shortened Address Mode Capability={0 1 1} Reduced Field; Active Mode={0 1 1} Reduced Field), but may have a shortened register mode disabled (Shortened Register Mode={0}→Disable) if the Slave5 1316 includes a large number of registers (e.g., 135 registers).

Examples of Processing Circuits and Methods

Figure 14:
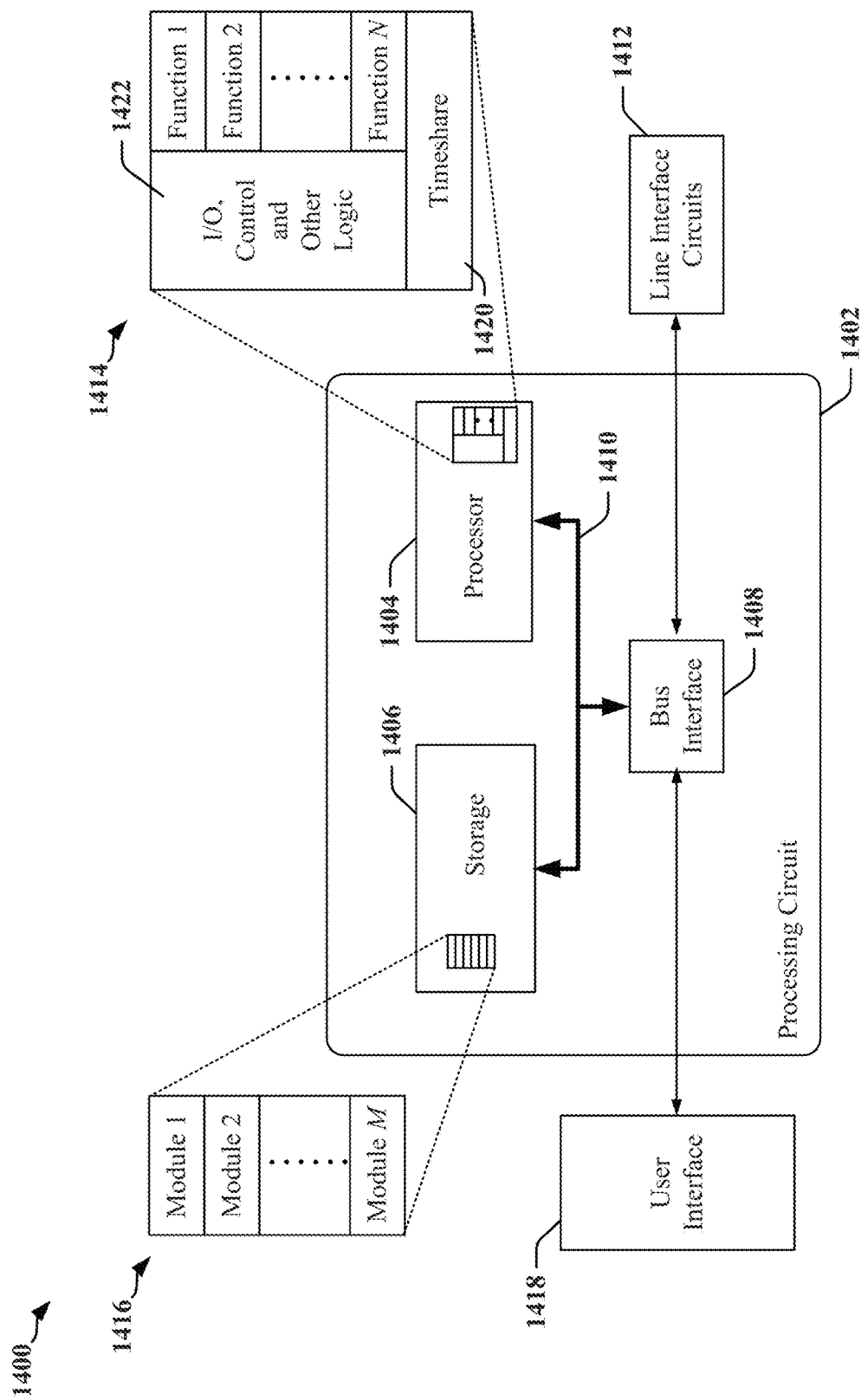
FIG. 14 is a block diagram illustrating an example of an apparatus employing a processing circuit that may be adapted according to certain aspects disclosed herein.

FIG. 14 is a conceptual diagram illustrating a simplified example of a hardware implementation for an apparatus 1400 employing a processing circuit 1402 that may be configured to perform one or more functions disclosed herein. In accordance with various aspects of the disclosure, an element, or any portion of an element, or any combination of elements as disclosed herein may be implemented using the processing circuit 1402. The processing circuit 1402 may include one or more processors 1404 that are controlled by some combination of hardware and software modules. Examples of processors 1404 include microprocessors, microcontrollers, digital signal processors (DSPs), ASICs, field programmable gate arrays (FPGAs), programmable logic devices (PLDs), state machines, sequencers, gated logic, discrete hardware circuits, and other suitable hardware configured to perform the various functionality described throughout this disclosure. The one or more processors 1404 may include specialized processors that perform specific functions, and that may be configured, augmented or controlled by one of the software modules 1416. The one or more processors 1404 may be configured through a combination of software modules 1416 loaded during initialization, and further configured by loading or unloading one or more software modules 1416 during operation.

In the illustrated example, the processing circuit 1402 may be implemented with a bus architecture, represented generally by the bus 1410. The bus 1410 may include any number of interconnecting buses and bridges depending on the specific application of the processing circuit 1402 and the overall design constraints. The bus 1410 links together various circuits including the one or more processors 1404, and storage 1406. Storage 1406 may include memory devices and mass storage devices, and may be referred to herein as computer-readable media and/or processor-readable media. The bus 1410 may also link various other circuits such as timing sources, timers, peripherals, voltage regulators, and power management circuits. A bus interface 1408 may provide an interface between the bus 1410 and one or more transceivers 1412. A transceiver 1412 may be provided for each networking technology supported by the processing circuit. In some instances, multiple networking technologies may share some or all of the circuitry or processing modules found in a transceiver 1412. Each transceiver 1412 provides a means for communicating with various other apparatus over a transmission medium. Depending upon the nature of the apparatus 1400, a user interface 1418 (e.g., keypad, display, speaker, microphone, joystick) may also be provided, and may be communicatively coupled to the bus 1410 directly or through the bus interface 1408.

A processor 1404 may be responsible for managing the bus 1410 and for general processing that may include the execution of software stored in a computer-readable medium that may include the storage 1406. In this respect, the processing circuit 1402, including the processor 1404, may be used to implement any of the methods, functions and techniques disclosed herein. The storage 1406 may be used for storing data that is manipulated by the processor 1404 when executing software, and the software may be configured to implement any one of the methods disclosed herein.

One or more processors 1404 in the processing circuit 1402 may execute software. Software shall be construed broadly to mean instructions, instruction sets, code, code segments, program code, programs, subprograms, software modules, applications, software applications, software packages, routines, subroutines, objects, executables, threads of execution, procedures, functions, algorithms, etc., whether referred to as software, firmware, middleware, microcode, hardware description language, or otherwise. The software may reside in computer-readable form in the storage 1406 or in an external computer readable medium. The external computer-readable medium and/or storage 1406 may include a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a "flash drive," a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium and/or storage 1406 may also include, by way of example, a carrier wave, a transmission line, and any other suitable medium for transmitting software and/or instructions that may be accessed and read by a computer. Computer-readable medium and/or the storage 1406 may reside in the processing circuit 1402, in the processor 1404, external to the processing circuit 1402, or be distributed across multiple entities including the processing circuit 1402. The computer-readable medium and/or storage 1406 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The storage 1406 may maintain software maintained and/or organized in loadable code segments, modules, applications, programs, etc., which may be referred to herein as software modules 1416. Each of the software modules 1416 may include instructions and data that, when installed or loaded on the processing circuit 1402 and executed by the one or more processors 1404, contribute to a run-time image 1414 that controls the operation of the one or more processors 1404. When executed, certain instructions may cause the processing circuit 1402 to perform functions in accordance with certain methods, algorithms and processes described herein.

Some of the software modules 1416 may be loaded during initialization of the processing circuit 1402, and these software modules 1416 may configure the processing circuit 1402 to enable performance of the various functions disclosed herein. For example, some software modules 1416 may configure internal devices and/or logic circuits 1422 of the processor 1404, and may manage access to external devices such as the transceiver 1412, the bus interface 1408, the user interface 1418, timers, mathematical coprocessors, and so on. The software modules 1416 may include a control program and/or an operating system that interacts with interrupt handlers and device drivers, and that controls access to various resources provided by the processing circuit 1402. The resources may include memory, processing time, access to the transceiver 1412, the user interface 1418, and so on.

One or more processors 1404 of the processing circuit 1402 may be multifunctional, whereby some of the software modules 1416 are loaded and configured to perform different functions or different instances of the same function. The one or more processors 1404 may additionally be adapted to manage background tasks initiated in response to inputs from the user interface 1418, the transceiver 1412, and device drivers, for example. To support the performance of multiple functions, the one or more processors 1404 may be configured to provide a multitasking environment, whereby each of a plurality of functions is implemented as a set of tasks serviced by the one or more processors 1404 as needed or desired. In one example, the multitasking environment may be implemented using a timesharing program 1420 that passes control of a processor 1404 between different tasks, whereby each task returns control of the one or more processors 1404 to the timesharing program 1420 upon completion of any outstanding operations and/or in response to an input such as an interrupt. When a task has control of the one or more processors 1404, the processing circuit is effectively specialized for the purposes addressed by the function associated with the controlling task. The timesharing program 1420 may include an operating system, a main loop that transfers control on a round-robin basis, a function that allocates control of the one or more processors 1404 in accordance with a prioritization of the functions, and/or an interrupt driven main loop that responds to external events by providing control of the one or more processors 1404 to a handling function.

Figure 15:
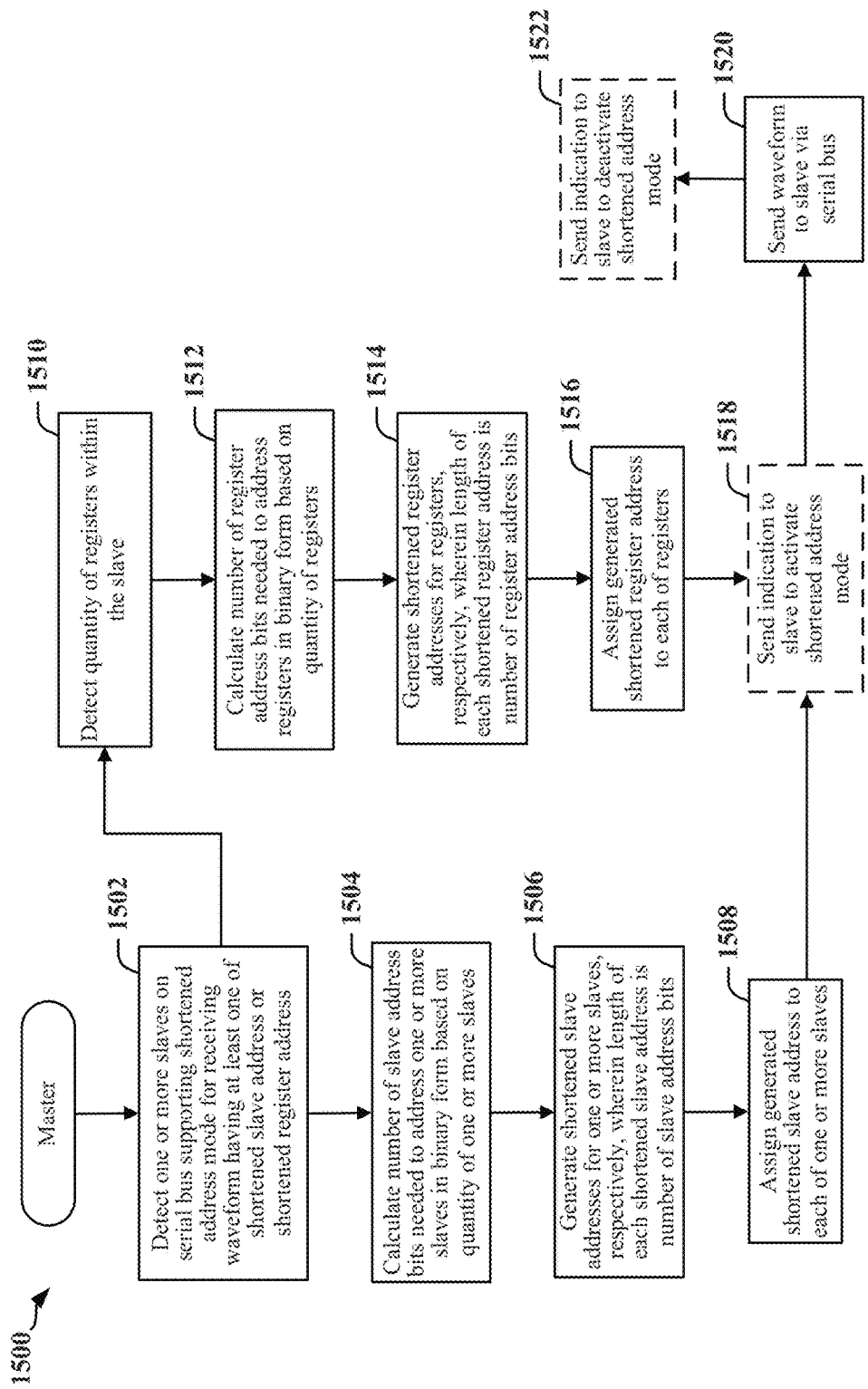
FIG. 15 is a flow chart of a method of data communication performed at a bus master device adapted in accordance with certain aspects disclosed herein.

FIG. 15 is a flow chart 1500 of a method of communication using a serial communication link. The method may be performed at a device operating as a bus master (e.g., apparatus 1400 of FIG. 14 or apparatus 1600 of FIG. 16).

At block 1502, the device may detect one or more slaves on a serial bus supporting a shortened address mode for receiving a waveform having at least one of a shortened slave address or a shortened register address.

At block 1504, the device may calculate a number of slave address bits needed to address the one or more slaves in a binary form based on a quantity of the one or more slaves. In one example, the number of slave address bits may be less than 7 bits, wherein 7 bits is the length of a normal slave address field in an I3C waveform. In another example, the calculated number of slave address bits may be as follows: 1 bit if the quantity of the one more slaves is 1 slave, 2 bits if the quantity of the one or more slaves is 2 to 4 slaves, 3 bits if the quantity of the one or more slaves is 5 to 8 slaves, and 4 bits if the quantity of the one or more slaves is 9 to 16 slaves.

At block 1506, the device may generate shortened slave addresses for the one or more slaves, respectively, wherein a length of each shortened slave address is the number of slave address bits.

At block 1508, the device may assign a generated shortened slave address to each of the one or more slaves. At block 1518, the device may optionally send an indication to a slave to activate the shortened address mode. Thereafter, at block 1520, the device may send the waveform to the slave via the serial bus using an assigned shortened slave address.

In an aspect of the disclosure, after detecting the one or more slaves on the serial bus supporting the shortened address mode (block 1502), the device may proceed to block 1510, wherein the device may detect a quantity of registers within the slave.

At block 1512, the device may calculate a number of register address bits needed to address the registers in a binary form based on the quantity of registers. In one example, the number of register address bits is less than 8 bits, wherein 8 bits is the length of a normal register address field in an I3C waveform. In another example, the calculated number of register address bits may be as follows: 1 bit if the quantity of registers is 1 register, 2 bits if the quantity of registers is 2 to 4 registers, 3 bits if the quantity of registers is 5 to 8 registers, 4 bits if the quantity of registers is 9 to 16 registers, and 5 bits if the quantity of registers is 17 to 32 registers.

At block 1514, the device may generate shortened register addresses for the registers, respectively, wherein a length of each shortened register address is the number of register address bits.

At block 1516, the device may assign a generated shortened register address to each of the registers. The device may then proceed to block 1518 to optionally send the indication to the slave to activate the shortened address mode. Thereafter, at block 1520, the device may send the waveform to the slave using the assigned shortened slave address and the assigned shortened register address.

In an aspect, the detecting at block 1502 may include the device detecting whether the slave supports a reduced field mode or a combined address mode. Accordingly the assigned shortened slave address and the assigned shortened register address may occupy different fields in the waveform if the slave supports the reduced field mode. Alternatively, the assigned shortened slave address and the assigned shortened register address may occupy a same field in the waveform if the slave supports the combined address mode.

At block 1522, the device may optionally send an indication to the slave to deactivate the shortened address mode.

Figure 16:
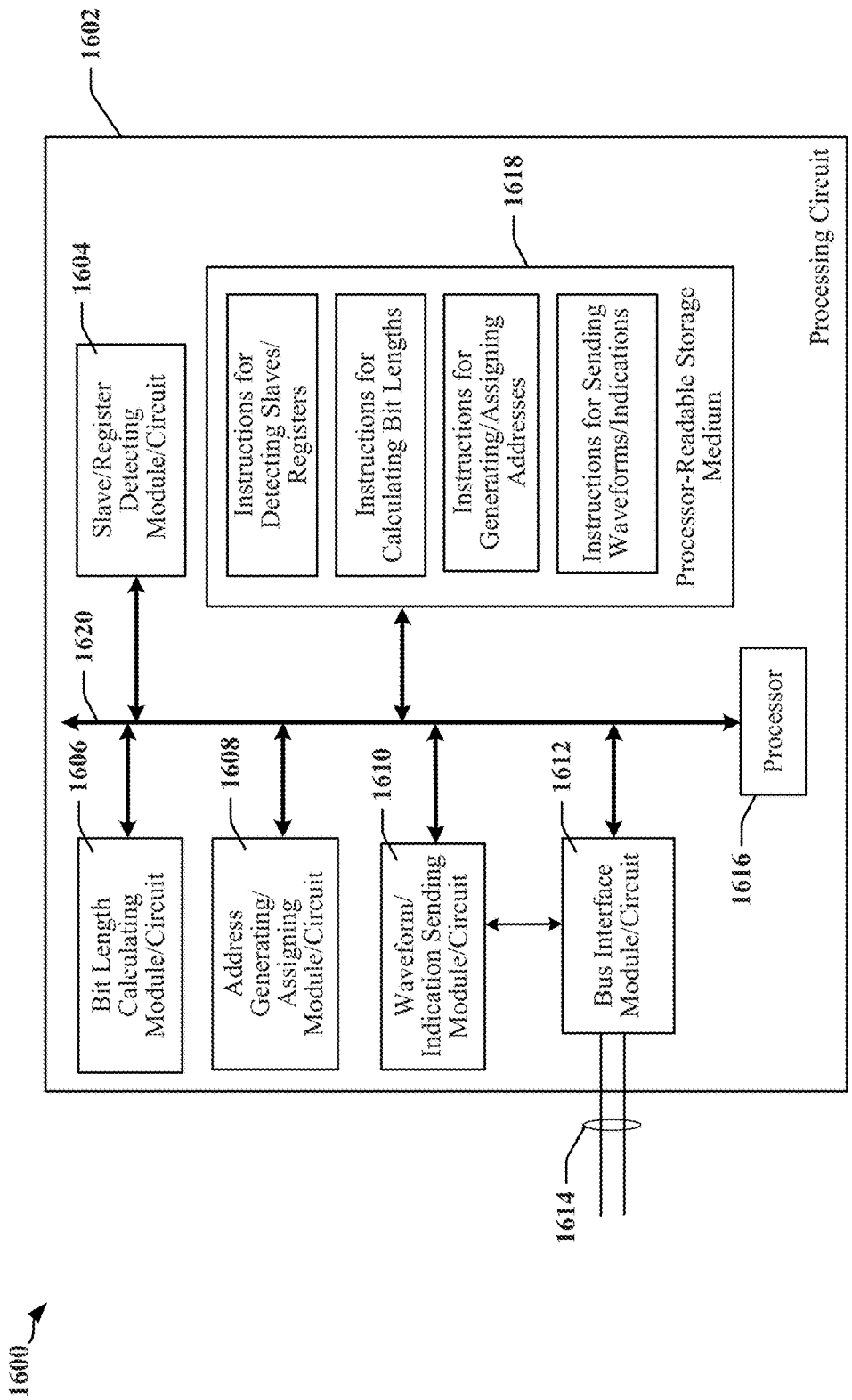
FIG. 16 is a diagram illustrating an example of a hardware implementation for a transmitting apparatus and employing a processing circuit adapted according to certain aspects disclosed herein.

FIG. 16 is a diagram illustrating a simplified example of a hardware implementation for an apparatus 1600 employing a processing circuit 1602 to support operations related to one or more aspects of the disclosure (e.g., aspects related to the method of FIG. 15 described above). The processing circuit typically has a processor 1616 that may include one or more of a microprocessor, microcontroller, digital signal processor, a sequencer and a state machine. The processing circuit 1602 may be implemented with a bus architecture, represented generally by the bus 1620. The bus 1620 may include any number of interconnecting buses and bridges depending on the specific application of the processing circuit 1602 and the overall design constraints. The bus 1620 links together various circuits including one or more processors and/or hardware modules, represented by the processor 1616, the modules or circuits 1604, 1606, 1608, 1610, line/bus interface circuits 1612 configurable to communicate over connectors or wires 1614 and the computer-readable storage medium 1618. The bus 1620 may also link various other circuits such as timing sources, peripherals, voltage regulators, and power management circuits, which are well known in the art, and therefore, will not be described any further.

The processor 1616 is responsible for general processing, including the execution of code/instructions stored on the computer-readable storage medium 1618. The code/instructions, when executed by the processor 1616, causes the processing circuit 1602 to perform the various functions described supra for any particular apparatus. The computer-readable storage medium may also be used for storing data that is manipulated by the processor 1616 when executing software, including data decoded from symbols transmitted over the connectors or wires 1614, which may be configured as data lanes and clock lanes. The processing circuit 1602 further includes at least one of the modules/circuits 1604, 1606, 1608, and 1610. The modules/circuits 1604, 1606, 1608, and 1610 may be software modules running in the processor 1616, resident/stored in the computer-readable storage medium 1618, one or more hardware modules coupled to the processor 1616, or some combination thereof. The modules/circuits 1604, 1606, 1608, and/or 1610 may include microcontroller instructions, state machine configuration parameters, or some combination thereof.

In one configuration, the apparatus 1600 includes a slave/register detecting module and/or circuit 1604 that is configured to, via an interface circuit 1612, detect one or more slaves on a serial bus supporting a shortened address mode for receiving a waveform having at least one of a shortened slave address or a shortened register address, and configured to, via the interface circuit 1612, detect a quantity of registers within a slave, a bit length calculating module and/or circuit 1606 that is configured to calculate a number of slave address bits needed to address the one or more slaves in a binary form based on a quantity of the one or more slaves and calculate a number of register address bits needed to address the registers in a binary form based on the quantity of registers, an address generating/assigning module and/or circuit 1608 that is configured to generate shortened slave addresses for the one or more slaves, respectively, wherein a length of each shortened slave address is the number of slave address bits, assign a generated shortened slave address to each of the one or more slaves, generate shortened register addresses for the registers, respectively, wherein a length of each shortened register address is the number of register address bits, and assign a generated shortened register address to each of the registers, and a waveform/indication sending module and/or circuit 1610 that is configured to, via the interface circuit 1612, send the waveform to the slave via the serial bus using an assigned shortened slave address and an assigned shortened register address, and configured to, via the interface circuit 1612, send at least one of an indication to the slave to activate the shortened address mode or an indication to the slave to deactivate the shortened address mode.

Figure 17:
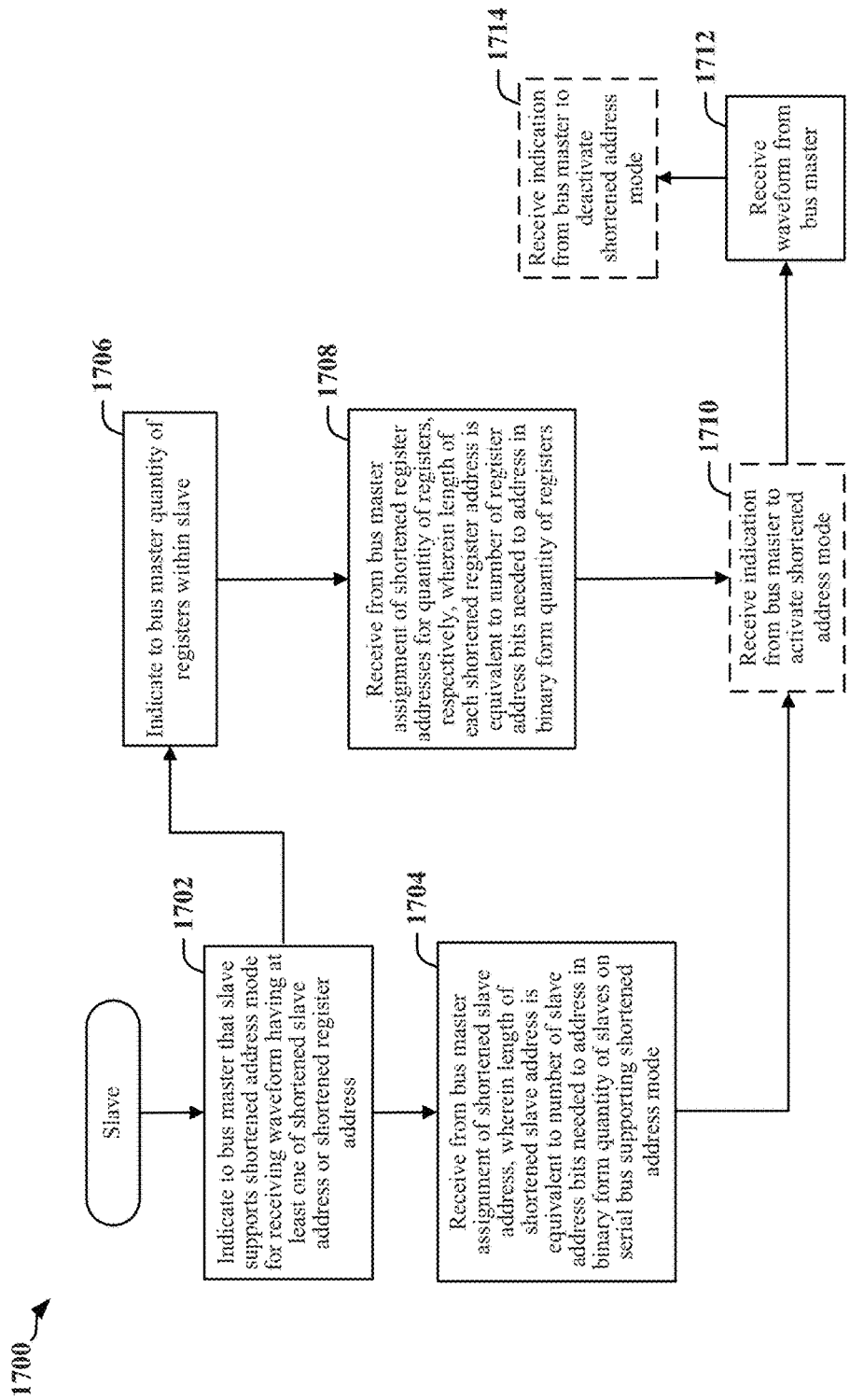
FIG. 17 is a flow chart of a method of data communication performed at a slave device adapted in accordance with certain aspects disclosed herein.

FIG. 17 is a flow chart 1700 of a method of communication using a serial communication link. The method may be performed at a slave device coupled to a serial bus (e.g., apparatus 1400 of FIG. 14 or apparatus 1800 of FIG. 18).

At block 1702, the slave device may indicate to a bus master that the slave device supports a shortened address mode for receiving a waveform having at least one of a shortened slave address or a shortened register address.

At block 1704, the slave device may receive from the bus master an assignment of the shortened slave address, wherein a length of the shortened slave address is equivalent to a number of slave address bits needed to address in a binary form a quantity of slaves on the serial bus supporting the shortened address mode. In one example, the number of slave address bits is less than 7 bits, wherein 7 bits is the length of a normal slave address field in an I3C waveform. In another example, the number of slave address bits may be as follows: 1 bit if the quantity slaves is 1 slave, 2 bits if the quantity of slaves is 2 to 4 slaves, 3 bits if the quantity of slaves is 5 to 8 slaves, and 4 bits if the quantity of slaves is 9 to 16 slaves.

At block 1710, the slave device may optionally receive an indication from the bus master to activate the shortened address mode. Thereafter, at block 1712, the slave device may receive the waveform from the bus master based on the shortened slave address.

In an aspect of the disclosure, after indicating support of the shortened slave address mode (block 1702) to the bus master, the slave device may proceed to block 1706, wherein the slave device may indicate a quantity of registers within the slave.

At block 1708, the slave device may receive from the bus master an assignment of shortened register addresses for the quantity of registers, respectively, wherein a length of each shortened register address is equivalent to a number of register address bits needed to address in a binary form the quantity of registers. In one example, the number of register address bits is less than 8 bits, wherein 8 bits is the length of a normal register address field in an I3C waveform. In another example, the number of register address bits may be as follows: 1 bit if the quantity of registers is 1 register, 2 bits if the quantity of registers is 2 to 4 registers, 3 bits if the quantity of registers is 5 to 8 registers, 4 bits if the quantity of registers is 9 to 16 registers, and 5 bits if the quantity of registers is 17 to 32 registers.

The slave device may then proceed to block 1710 to optionally receive the indication from the bus master to activate the shortened address mode. Thereafter, at block 1712, the slave device may receive the waveform from the bus master based on the shortened slave address and the shortened register address.

In an aspect, the indicating at block 1702 may include the slave device indicating whether the slave device supports a reduced field mode or a combined address mode. Accordingly, the shortened slave address and the shortened register address occupy different fields in the waveform if the slave device supports the reduced field mode. Alternatively, the shortened slave address and the shortened register address occupy a same field in the waveform if the slave device supports the combined address mode.

At block 1714, the slave device may optionally receive an indication from the bus master to deactivate the shortened address mode.

Figure 18:
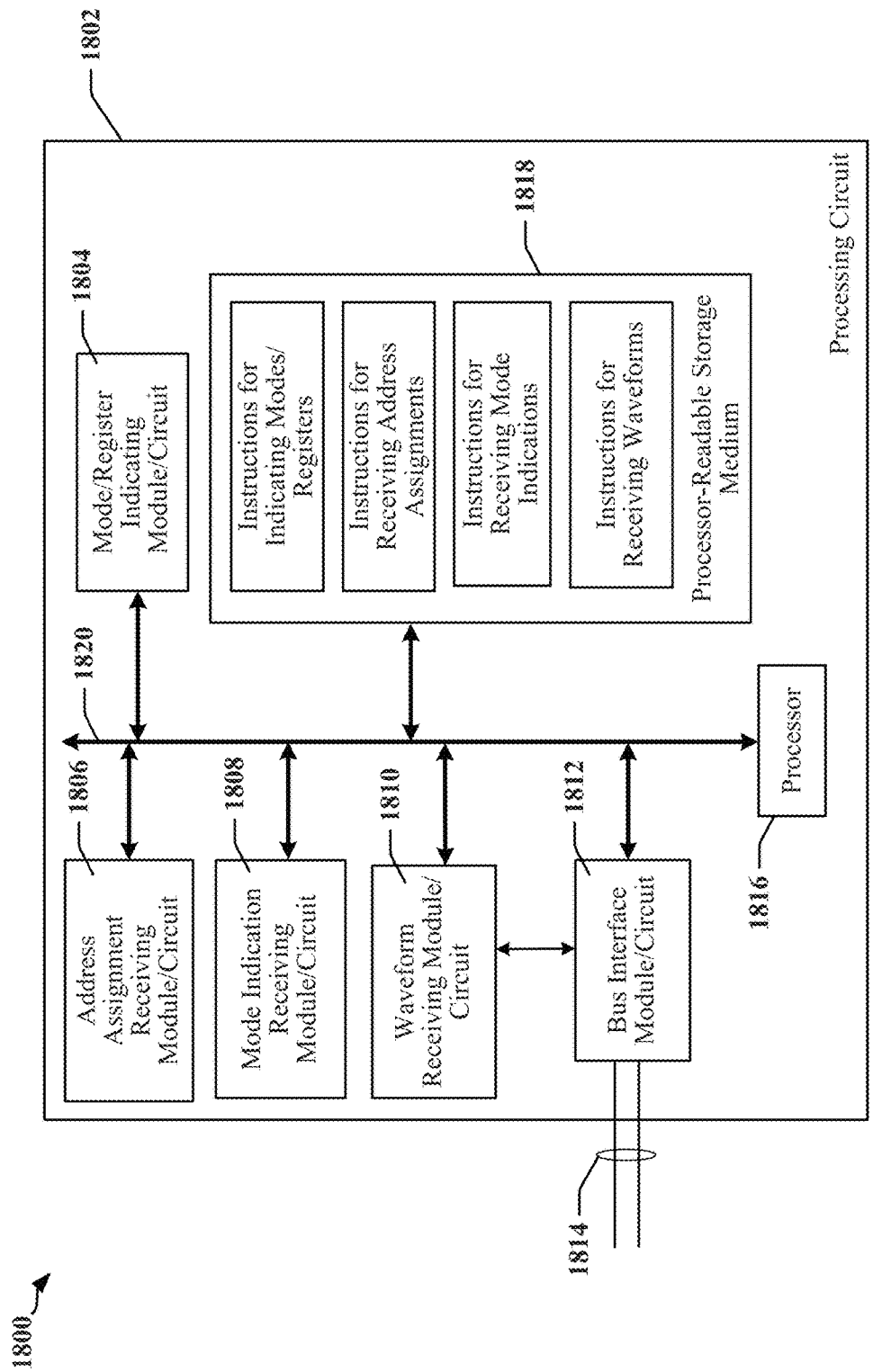
FIG. 18 is a diagram illustrating an example of a hardware implementation for a receiving apparatus and employing a processing circuit adapted according to certain aspects disclosed herein.

FIG. 18 is a diagram illustrating a simplified example of a hardware implementation for an apparatus 1800 employing a processing circuit 1802 to support operations related to one or more aspects of the disclosure (e.g., aspects related to the method of FIG. 17 described above). The processing circuit typically has a processor 1816 that may include one or more of a microprocessor, microcontroller, digital signal processor, a sequencer and a state machine. The processing circuit 1802 may be implemented with a bus architecture, represented generally by the bus 1820. The bus 1820 may include any number of interconnecting buses and bridges depending on the specific application of the processing circuit 1802 and the overall design constraints. The bus 1820 links together various circuits including one or more processors and/or hardware modules, represented by the processor 1816, the modules or circuits 1804, 1806, 1808, 1810, line/bus interface circuits 1812 configurable to communicate over connectors or wires 1814 and the computer-readable storage medium 1818. The bus 1820 may also link various other circuits such as timing sources, peripherals, voltage regulators, and power management circuits, which are well known in the art, and therefore, will not be described any further.

The processor 1816 is responsible for general processing, including the execution of code/instructions stored on the computer-readable storage medium 1818. The code/instructions, when executed by the processor 1816, causes the processing circuit 1802 to perform the various functions described supra for any particular apparatus. The computer-readable storage medium may also be used for storing data that is manipulated by the processor 1816 when executing software, including data decoded from symbols transmitted over the connectors or wires 1814, which may be configured as data lanes and clock lanes. The processing circuit 1802 further includes at least one of the modules/circuits 1804, 1806, 1808 and 1810. The modules/circuits 1804, 1806, 1808, and 1810 may be software modules running in the processor 1816, resident/stored in the computer-readable storage medium 1818, one or more hardware modules coupled to the processor 1816, or some combination thereof. The modules/circuits 1804, 1806, 1808, and/or 1810 may include microcontroller instructions, state machine configuration parameters, or some combination thereof.

In one configuration, the apparatus 1800 includes a mode/register indicating module and/or circuit 1804 that is configured to, via an interface circuit 1812, indicate to a bus master that the slave supports a shortened address mode for receiving a waveform having at least one of a shortened slave address or a shortened register address and indicate to the bus master a quantity of registers within the slave, an address assignment receiving module and/or circuit 1806 that is configured to, via the interface circuit 1812, receive from the bus master an assignment of a shortened slave address, wherein a length of the shortened slave address is equivalent to a number of slave address bits needed to address in a binary form a quantity of slaves on the serial bus supporting the shortened address mode, and receive from the bus master an assignment of shortened register addresses for the quantity of registers, respectively, wherein a length of each shortened register address is equivalent to a number of register address bits needed to address in a binary form the quantity of registers, a mode indication receiving module and/or circuit 1808 that is configured to receive, via the interface circuit 1812, at least one of an indication from the bus master to activate the shortened address or an indication from the bus master to deactivate the shortened address mode, and a waveform receiving module and/or circuit 1810 that is configured to, via the interface circuit 1812, receive the waveform from the bus master based on the shortened slave address and an assigned shortened register address.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method performed at a device operating as a bus master, comprising:
   detecting one or more slaves on a serial bus supporting a shortened address mode for receiving a waveform having at least one of a shortened slave address or a shortened register address;
   calculating a number of slave address bits needed to address the one or more slaves in a binary form based on a quantity of the one or more slaves;
   generating shortened slave addresses for the one or more slaves, respectively, wherein a length of each shortened slave address is the number of slave address bits;
   assigning a generated shortened slave address to each of the one or more slaves;
   sending a first indication to a slave to activate the shortened address mode;
   sending the waveform to the slave via the serial bus using an assigned shortened slave address; and
   sending a second indication to the slave to deactivate the shortened address mode.

2. The method of claim 1, wherein the number of slave address bits is less than 7 bits.

3. The method of claim 1, wherein:
   the calculated number of slave address bits is 1 bit if the quantity of the one or more slaves is 1 slave;
   the calculated number of slave address bits is 2 bits if the quantity of the one or more slaves is 2 to 4 slaves;
   the calculated number of slave address bits is 3 bits if the quantity of the one or more slaves is 5 to 8 slaves; and
   the calculated number of slave address bits is 4 bits if the quantity of the one or more slaves is 9 to 16 slaves.

4. The method of claim 1, further including:
   detecting a quantity of registers within the slave;
   calculating a number of register address bits needed to address registers in a binary form based on the quantity of registers;
   generating shortened register addresses for the registers, respectively, wherein a length of each shortened register address is the number of register address bits; and
   assigning a generated shortened register address to each of the registers,
   wherein the waveform is sent to the slave using an assigned shortened register address.

5. The method of claim 4, wherein the number of register address bits is less than 8 bits.

6. The method of claim 4, wherein:
   the calculated number of register address bits is 1 bit if the quantity of registers is 1 register;
   the calculated number of register address bits is 2 bits if the quantity of registers is 2 to 4 registers;
   the calculated number of register address bits is 3 bits if the quantity of registers is 5 to 8 registers;
   the calculated number of register address bits is 4 bits if the quantity of registers is 9 to 16 registers; and
   the calculated number of register address bits is 5 bits if the quantity of registers is 17 to 32 registers.

7. The method of claim 4, wherein:
   the detecting includes detecting whether the slave supports a reduced field mode or a combined address mode,
   the assigned shortened slave address and the assigned shortened register address occupy different fields in the waveform if the slave supports the reduced field mode, and
   the assigned shortened slave address and the assigned shortened register address occupy a same field in the waveform if the slave supports the combined address mode.

8. A bus master apparatus, comprising:
   an interface circuit configured to couple the bus master apparatus to a serial bus; and
   a processing circuit configured to:
      detect one or more slaves on the serial bus supporting a shortened address mode for receiving a waveform having at least one of a shortened slave address or a shortened register address,
      calculate a number of slave address bits needed to address the one or more slaves in a binary form based on a quantity of the one or more slaves,
      generate shortened slave addresses for the one or more slaves, respectively, wherein a length of each shortened slave address is the number of slave address bits,
      assign a generated shortened slave address to each of the one or more slaves,
      send a first indication to a slave to activate the shortened address mode,
      send the waveform to the slave via the serial bus using an assigned shortened slave address, and
      send a second indication to the slave to deactivate the shortened address mode.

9. The bus master apparatus of claim 8, wherein the number of slave address bits is less than 7 bits.

10. The bus master apparatus of claim 8, wherein the processing circuit is further configured to:
    detect a quantity of registers within the slave;
    calculate a number of register address bits needed to address registers in a binary form based on the quantity of registers;
    generate shortened register addresses for the registers, respectively, wherein a length of each shortened register address is the number of register address bits; and
    assign a generated shortened register address to each of the registers,
    wherein the waveform is sent to the slave using an assigned shortened register address.

11. The bus master apparatus of claim 10, wherein the number of register address bits is less than 8 bits.

12. The bus master apparatus of claim 10, wherein:
    the processing circuit is further configured to detect whether the slave supports a reduced field mode or a combined address mode,
    the assigned shortened slave address and the assigned shortened register address occupy different fields in the waveform if the slave supports the reduced field mode, and
    the assigned shortened slave address and the assigned shortened register address occupy a same field in the waveform if the slave supports the combined address mode.

13. A method performed at a slave coupled to a serial bus, comprising:
    indicating to a bus master that the slave supports a shortened address mode for receiving a waveform having at least one of a shortened slave address or a shortened register address;

receiving from the bus master an assignment of the shortened slave address, wherein a length of the shortened slave address is equivalent to a number of slave address bits needed to address in a binary form a quantity of slaves on the serial bus supporting the shortened address mode;

receiving a first indication from the bus master to activate the shortened address mode;

receiving the waveform from the bus master based on the assigned shortened slave address; and receiving a second indication from the bus master to deactivate the shortened address mode.

14. The method of claim 13, wherein the number of slave address bits is less than 7 bits.

15. The method of claim 13, wherein:
the number of slave address bits is 1 bit if the quantity of slaves is 1 slave;
the number of slave address bits is 2 bits if the quantity of slaves is 2 to 4 slaves;
the number of slave address bits is 3 bits if the quantity of slaves is 5 to 8 slaves; and
the number of slave address bits is 4 bits if the quantity of slaves is 9 to 16 slaves.

16. The method of claim 13, further including:
indicating to the bus master a quantity of registers within the slave; and
receiving from the bus master an assignment of shortened register addresses for the quantity of registers, respectively, wherein a length of each shortened register address is equivalent to a number of register address bits needed to address in a binary form the quantity of registers,
wherein the waveform is received from the bus master based on an assigned shortened register address.

17. The method of claim 16, wherein the number of register address bits is less than 8 bits.

18. The method of claim 16, wherein:
the number of register address bits is 1 bit if the quantity of registers is 1 register;
the number of register address bits is 2 bits if the quantity of registers is 2 to 4 registers;
the number of register address bits is 3 bits if the quantity of registers is 5 to 8 registers;
the number of register address bits is 4 bits if the quantity of registers is 9 to 16 registers; and
the number of register address bits is 5 bits if the quantity of registers is 17 to 32 registers.

19. The method of claim 16, wherein:
the indicating includes indicating whether the slave supports a reduced field mode or a combined address mode,
the assigned shortened slave address and the assigned shortened register address occupy different fields in the waveform if the slave supports the reduced field mode, and
the assigned shortened slave address and the assigned shortened register address occupy a same field in the waveform if the slave supports the combined address mode.

20. A slave device, comprising:
an interface circuit configured to couple the slave device to a serial bus; and
a processing circuit configured to:
indicate to a bus master that the slave device supports a shortened address mode for receiving a waveform having at least one of a shortened slave address or a shortened register address;
receive from the bus master an assignment of the shortened slave address, wherein a length of the shortened slave address is equivalent to a number of slave address bits needed to address in a binary form a quantity of slaves on the serial bus supporting the shortened address mode;
receive a first indication from the bus master to activate the shortened address mode;
receive the waveform from the bus master based on the assigned shortened slave address; and
receive a second indication from the bus master to deactivate the shortened address mode.

21. The slave device of claim 20, wherein the number of slave address bits is less than 7 bits.

22. The slave device of claim 20, wherein the processing circuit is further configured to:
indicate to the bus master a quantity of registers within the slave device; and
receive from the bus master an assignment of shortened register addresses for the quantity of registers, respectively, wherein a length of each shortened register address is equivalent to a number of register address bits needed to address in a binary form the quantity of registers,
wherein the waveform is received from the bus master based on an assigned shortened register address.

23. The slave device of claim 22, wherein the number of register address bits is less than 8 bits.

24. The slave device of claim 22, wherein:
the processing circuit is further configured to indicate whether the slave device supports a reduced field mode or a combined address mode,
the assigned shortened slave address and the assigned shortened register address occupy different fields in the waveform if the slave device supports the reduced field mode, and
the assigned shortened slave address and the assigned shortened register address occupy a same field in the waveform if the slave device supports the combined address mode.

* * * * *